US010306202B2

(12) United States Patent
Raghoebardajal et al.

(10) Patent No.: US 10,306,202 B2
(45) Date of Patent: May 28, 2019

(54) IMAGE ENCODING AND DISPLAY

(71) Applicant: Sony Computer Entertainment Europe Limited, London (GB)

(72) Inventors: Sharwin Winesh Raghoebardajal, London (GB); Ian Henry Bickerstaff, London (GB)

(73) Assignee: Sony Interactive Entertainment Europe Limited (GB)

( * ) Notice: Subject to any disclaimer, the term of this patent is extended or adjusted under 35 U.S.C. 154(b) by 134 days.

(21) Appl. No.: 15/112,324

(22) PCT Filed: Feb. 25, 2015

(86) PCT No.: PCT/GB2015/050534
§ 371 (c)(1),
(2) Date: Jul. 18, 2016

(87) PCT Pub. No.: WO2015/128633
PCT Pub. Date: Sep. 3, 2015

(65) Prior Publication Data
US 2016/0337630 A1  Nov. 17, 2016

(30) Foreign Application Priority Data
Feb. 26, 2014 (GB) .................................. 1403378.1

(51) Int. Cl.
*A63F 13/26* (2014.01)
*G06T 19/00* (2011.01)
(Continued)

(52) U.S. Cl.
CPC ......... *H04N 13/117* (2018.05); *A63F 13/212* (2014.09); *A63F 13/26* (2014.09);
(Continued)

(58) Field of Classification Search
CPC .. H04N 13/117; H04N 13/279; H04N 13/128; H04N 13/167; H04N 13/332;
(Continued)

(56) References Cited

U.S. PATENT DOCUMENTS 8,155,457 B2   4/2012  Cohen
9,544,498 B2   1/2017  Niemi
(Continued)

FOREIGN PATENT DOCUMENTS

CN   103189796 A    7/2013
EP     2602785 A1   6/2013
(Continued)

OTHER PUBLICATIONS

Olano M. et al: "Combatting Rendering Latency", Proceedings of the Symposium on Interactive 3D Graphics, Apr. 9, 1995 (Apr. 9, 2009), pp. 19-24.
(Continued)

*Primary Examiner* — Michael E Teitelbaum
(74) *Attorney, Agent, or Firm* — Lerner, David, Littenberg, Krumholz & Mentlik, LLP

(57) ABSTRACT

Aspects of the technology encompass image encoding, which includes generating image content according to a viewpoint defined by image viewpoint data. Successive output images are generated such that each output image includes image content generated according to one or more viewpoints, and encoding metadata associated with each output image which indicates each viewpoint relating to image content contained in that output image, and which defines which portions of that output image were generated according to each of those viewpoints. An image display method for generating successive display images from successive input images is also provided, which includes re-projecting portions of each input image to form a respective
(Continued)

Figure 1:
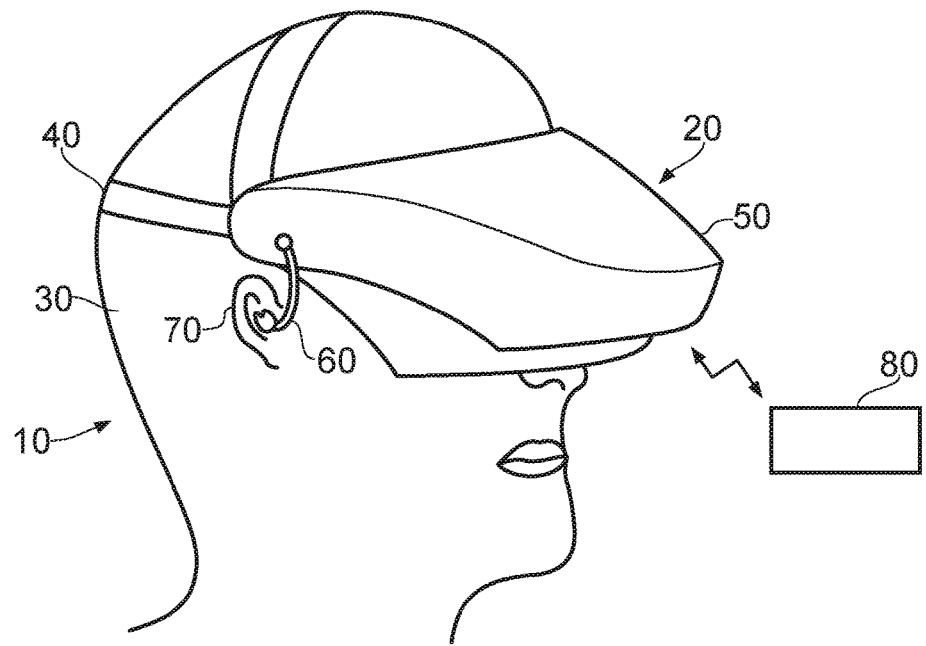

display image, according to any differences between a desired display viewpoint and a particular viewpoint defined for that portion by metadata associated with a respective input image. The metadata indicating viewpoints relating to image content contained in the respective input images.

10 Claims, 26 Drawing Sheets

(51) Int. Cl.

| | |
|---|---|
| H04N 13/00 | (2018.01) |
| H04N 5/232 | (2006.01) |
| A63F 13/212 | (2014.01) |
| H04N 13/117 | (2018.01) |
| H04N 13/128 | (2018.01) |
| H04N 13/161 | (2018.01) |
| H04N 13/167 | (2018.01) |
| H04N 13/279 | (2018.01) |
| H04N 13/332 | (2018.01) |
| H04N 13/344 | (2018.01) |
| A63F 13/5252 | (2014.01) |

(52) U.S. Cl.
CPC ........ *A63F 13/5252* (2014.09); *G06T 19/006* (2013.01); *H04N 5/23238* (2013.01); *H04N 13/128* (2018.05); *H04N 13/161* (2018.05); *H04N 13/167* (2018.05); *H04N 13/279* (2018.05); *H04N 13/332* (2018.05); *H04N 13/344* (2018.05); *A63F 2300/8082* (2013.01); *H04N 2013/0081* (2013.01); *H04N 2013/0096* (2013.01); *H04N 2213/005* (2013.01)

(58) Field of Classification Search
CPC .. H04N 13/344; H04N 13/161; H04N 13/212; H04N 13/26; H04N 13/5252; H04N 5/23238; H04N 2013/0081; H04N 2013/0096; H04N 2213/005; G06T 19/006; A63F 13/212; A63F 13/26; A63F 13/5252; A63F 2300/8082
See application file for complete search history.

(56) References Cited

U.S. PATENT DOCUMENTS

| | | | |
|---|---|---|---|
| 2004/0113818 A1* | 6/2004 | Yokokohji | ........... G01C 21/365 340/995.1 |
| 2009/0309987 A1* | 12/2009 | Kimura | ................. G06T 3/4038 348/218.1 |
| 2010/0124353 A1 | 5/2010 | Cohen | |

FOREIGN PATENT DOCUMENTS

| | | |
|---|---|---|
| EP | 2860702 A1 | 4/2015 |
| GB | 2250668 A | 6/1992 |
| WO | 2005057932 A1 | 6/2005 |
| WO | 2012176109 A1 | 12/2012 |
| WO | 2013187130 A1 | 12/2013 |

OTHER PUBLICATIONS

Webb I. et al: "An Extension to Optic Flow Analysis for the Generation of Computer Animated Images", Nov. 1, 1998 (Nov. 1, 1998), XP055183469, retrieved from the Internet on Apr. 16, 2015: URL:http://people.cs.uct.ac.za/-edwin/MyBib/1998-webb-thesis. pdf; Section 2.4.2; p. 17 Chapter 3; p. 42 Section 3.4; p. 45 Section 3.4.4; p. 50.

Peek E.M. et al: "Image warping for enhancing consumer applications of head-mounted displays", Advances in Ontologies. Australian Computer Society. Inc., Jan. 20, 2014 (Jan. 20, 2014), pp. 47-55.

Mark W.R. et al: "Post-Rendering 3D Warping", Proceedings of 1997 Symposium on Interactive 3D Graphics, Providence, RI, Apr. 27-30, pp. 7-16.

Peek E. et al: "More for less: Fast image warping for improving the appearance of head tracking on HMDs", 2013 28th International Conference on Image and Vision Computing New Zealand (IVCNZ 2013), Nov. 1, 2013 (Nov. 1, 2013), pp. 41-46.

International Search Report for Application No. PCT/GB2015/050534, dated May 20, 2015.

Intellectual Property Office Search Report for Application No. GB1403378.1, dated Aug. 20, 2014.

Chinese Office Action for Application No. 201580022154.3, dated Feb. 22, 2019, 14 pages.

* cited by examiner

LEFT                    RIGHT

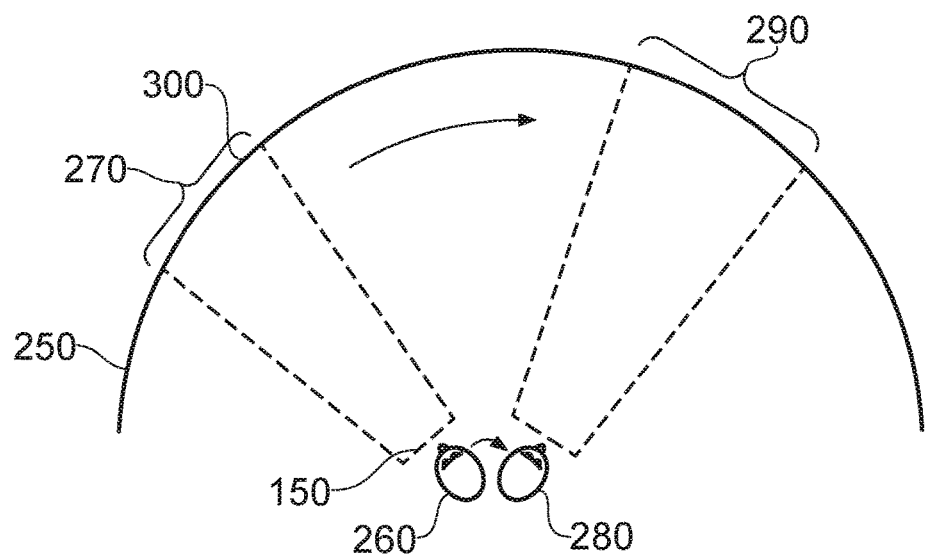
FIG. 6
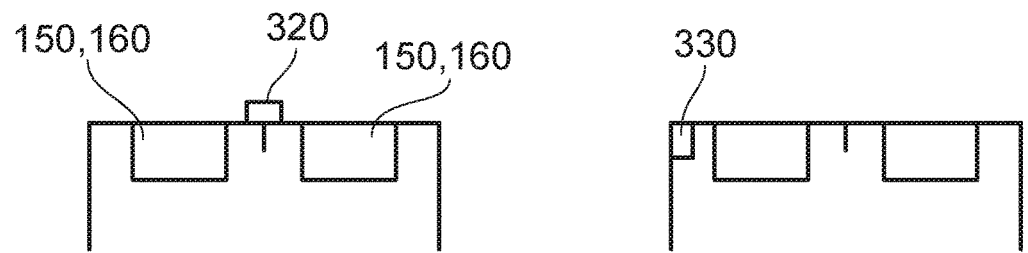
FIG. 7A
FIG. 7B

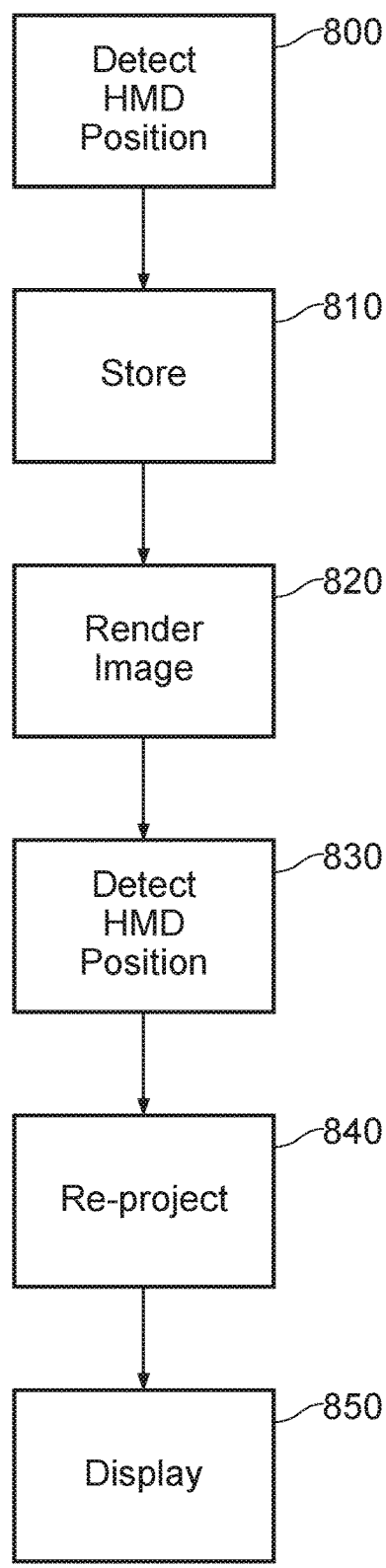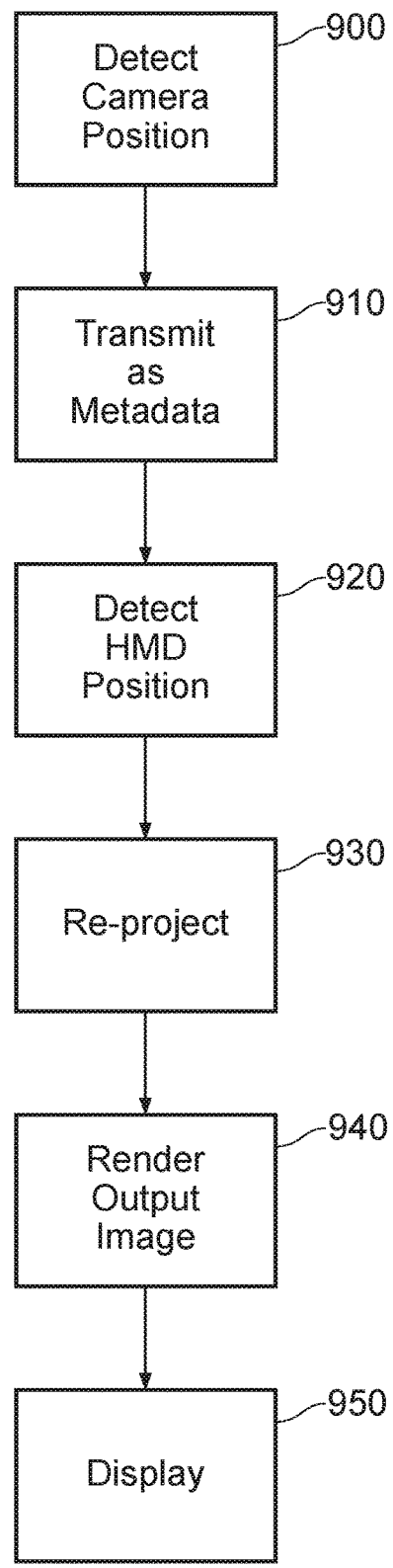
FIG. 22
FIG. 24

IMAGE ENCODING AND DISPLAY

CROSS REFERENCE TO RELATED APPLICATIONS

The present application is a national phase entry under 35 U.S.C. § 371 of International Application No. PCT/GB2015/050534, filed Feb. 25, 2015, published in English, which claims the benefit of and priority to GB Patent Application No. 1403378.1, filed Feb. 26, 2014, the entire disclosures of which are hereby incorporated by reference herein.

This invention relates to image encoding and display.

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As background, an example head-mountable display (HMD) will be discussed, although (as described further below) the invention is applicable to other types of displays.

An HMD is an image or video display device which may be worn on the head or as part of a helmet. Either one eye or both eyes are provided with small electronic display devices.

Some HMDs allow a displayed image to be superimposed on a real-world view. This type of HMD can be referred to as an optical see-through HMD and generally requires the display devices to be positioned somewhere other than directly in front of the user's eyes. Some way of deflecting the displayed image so that the user may see it is then required. This might be through the use of a partially reflective mirror placed in front of the user's eyes so as to allow the user to see through the mirror but also to see a reflection of the output of the display devices. In another arrangement, disclosed in EP-A-1 731 943 and US-A-2010/0157433, a waveguide arrangement employing total internal reflection is used to convey a displayed image from a display device disposed to the side of the user's head so that the user may see the displayed image but still see a view of the real world through the waveguide. Once again, in either of these types of arrangement, a virtual image of the display is created (using known techniques) so that the user sees the virtual image at an appropriate size and distance to allow relaxed viewing. For example, even though the physical display device may be tiny (for example, 10 mm×10 mm) and may be just a few millimetres from the user's eye, the virtual image may be arranged so as to be perceived by the user at a distance of (for example) 20 m from the user, having a perceived size of 5 m×5 m.

Other HMDs, however, allow the user only to see the displayed images, which is to say that they obscure the real world environment surrounding the user. This type of HMD can position the actual display devices in front of the user's eyes, in association with appropriate lenses which place a virtual displayed image at a suitable distance for the user to focus in a relaxed manner—for example, at a similar virtual distance and perceived size as the optical see-through HMD described above. This type of device might be used for viewing movies or similar recorded content, or for viewing so-called virtual reality content representing a virtual space surrounding the user. It is of course however possible to display a real-world view on this type of HMD, for example by using a forward-facing camera to generate images for display on the display devices.

Although the original development of HMDs was perhaps driven by the military and professional applications of these devices, HMDs are becoming more popular for use by casual users in, for example, computer game or domestic computing applications.

This invention is defined by claim 1.

Further respective aspects and features of the invention are defined in the appended claims.

Figure 2:
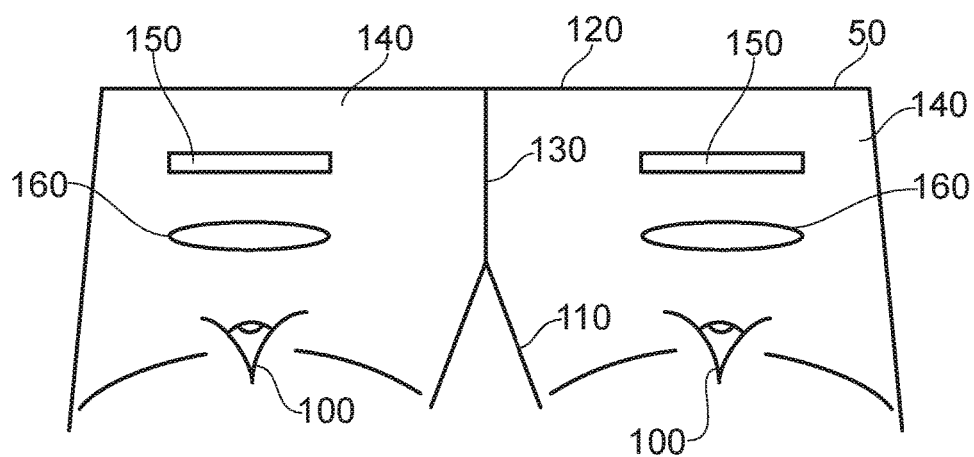
Figure 3:
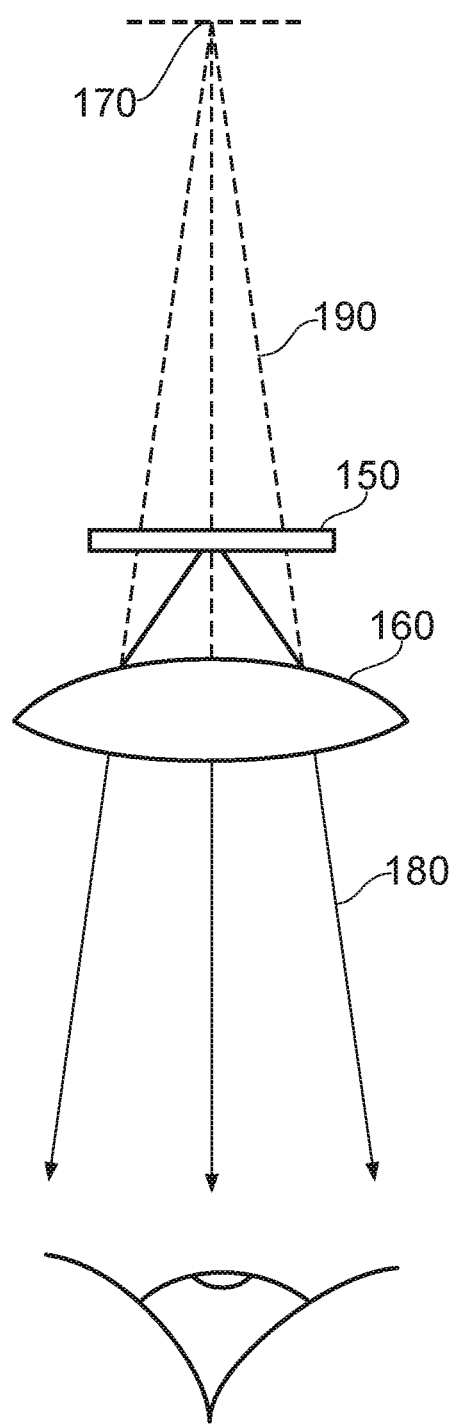
Figure 5:
Figure 4:
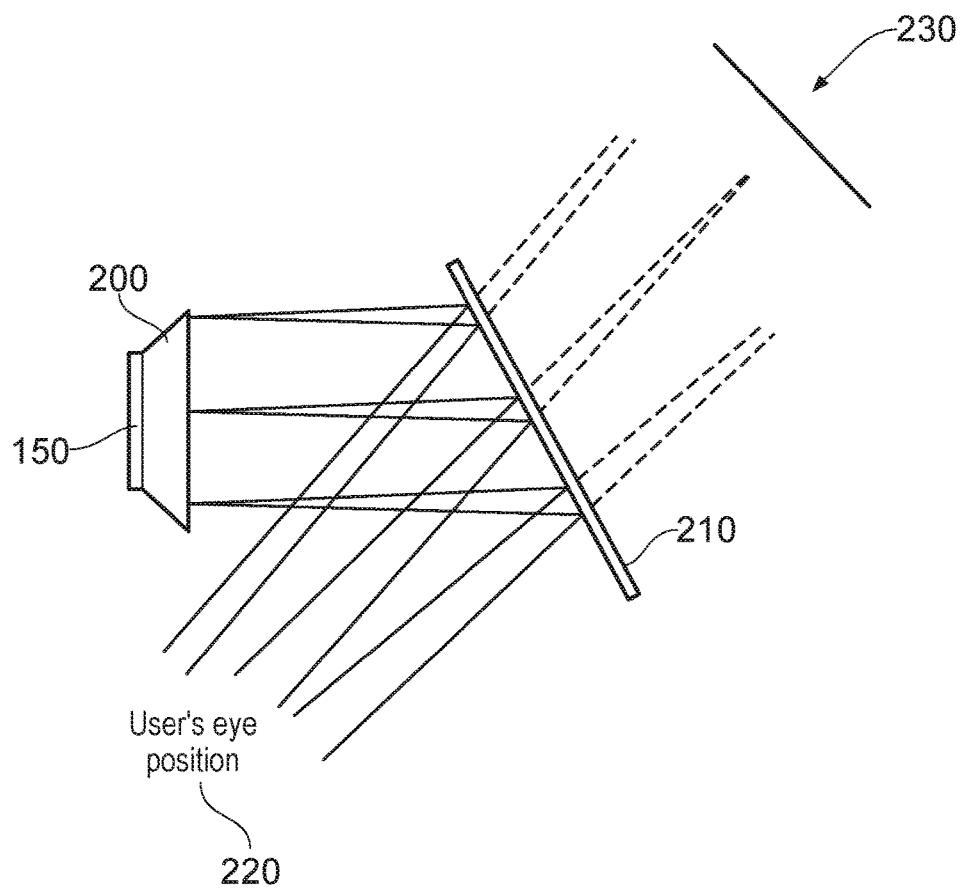
Figure 9:
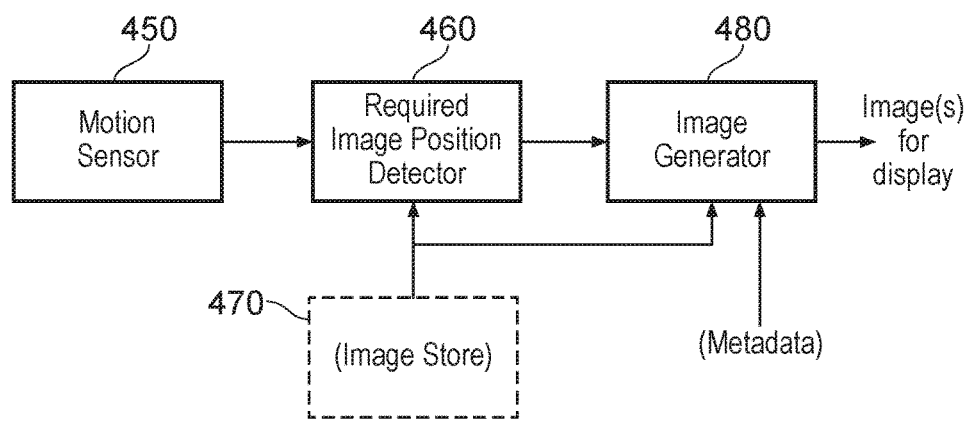
Figure 8:
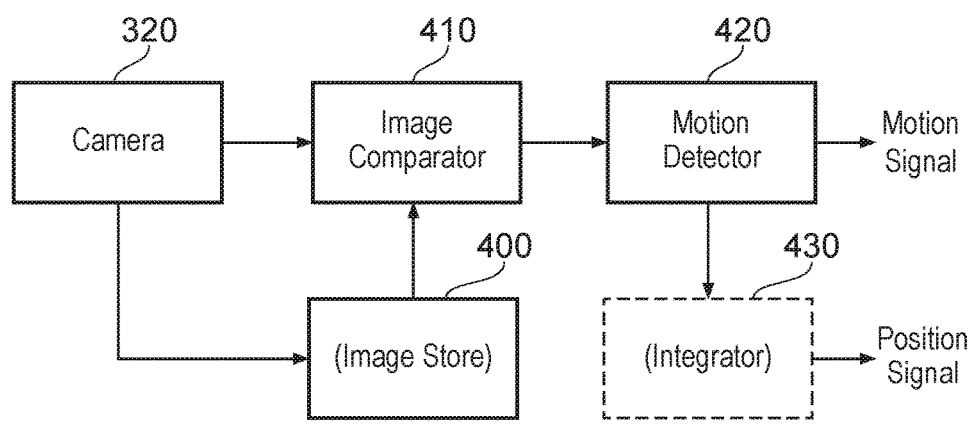
Figure 10:
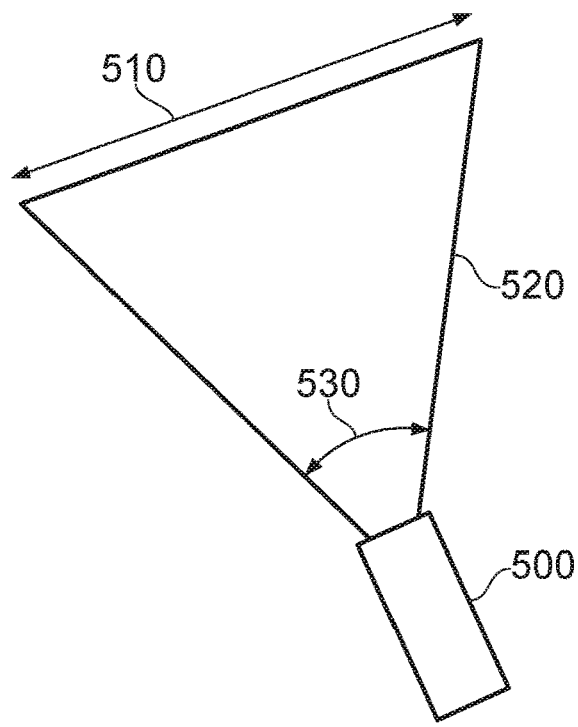
Figure 11:
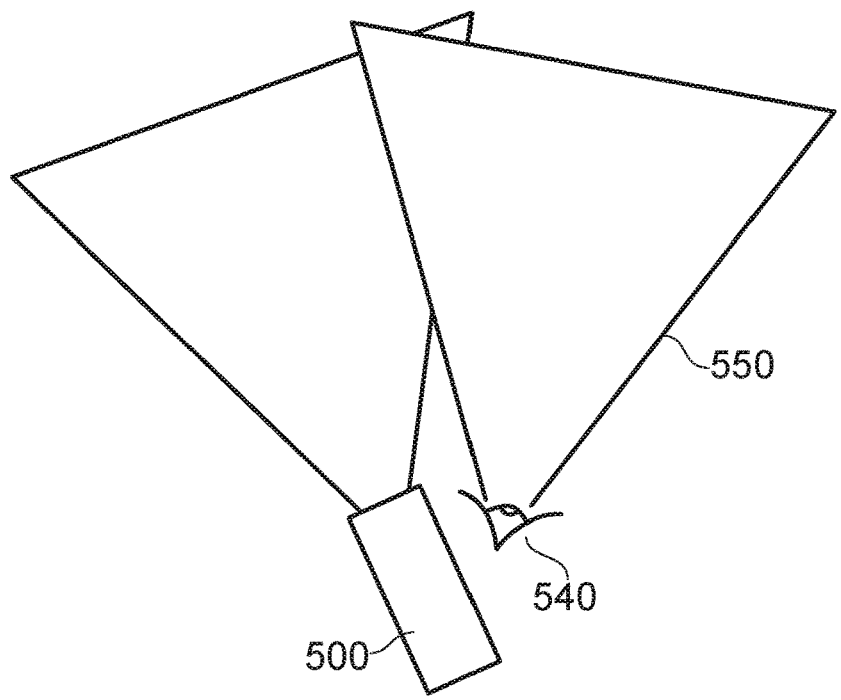
Figure 12:
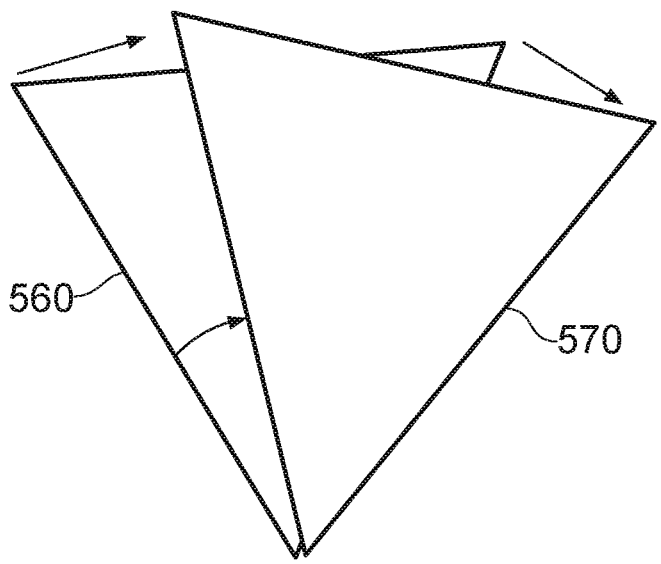
Figure 13:
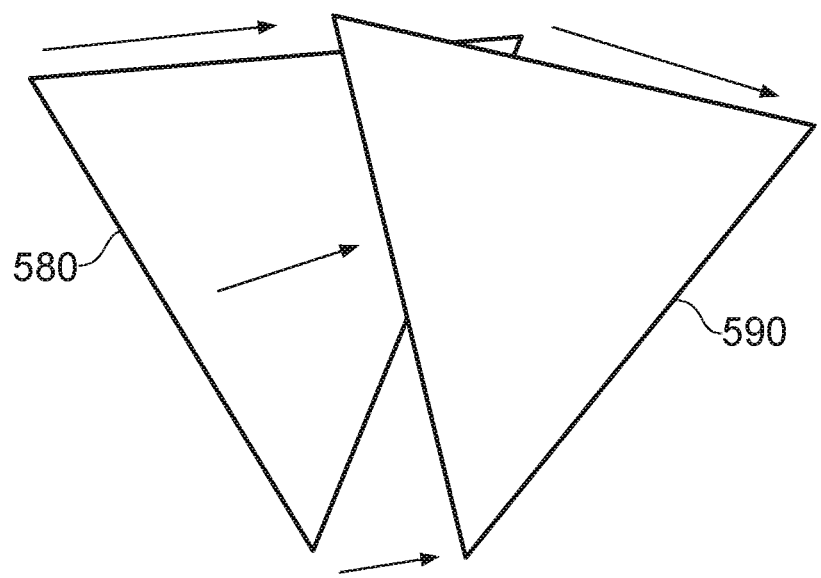
Figure 14:
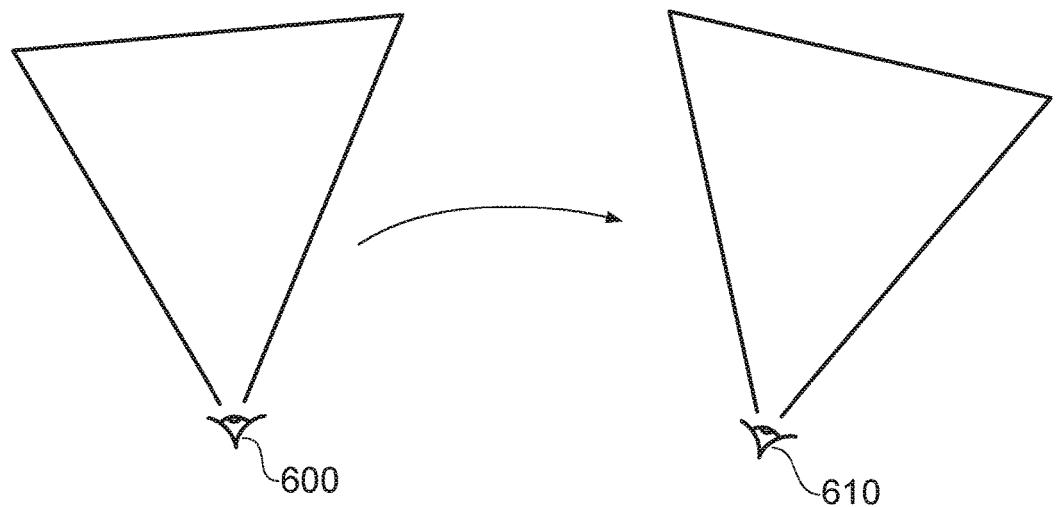
Figure 15:
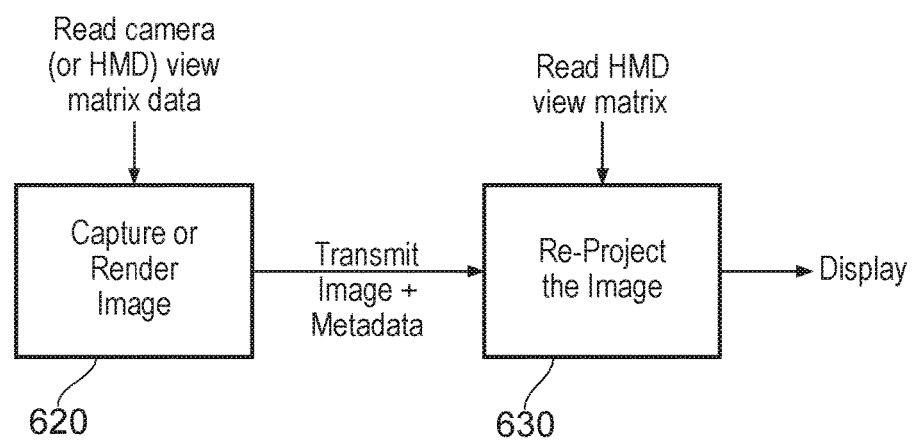
Figure 16:
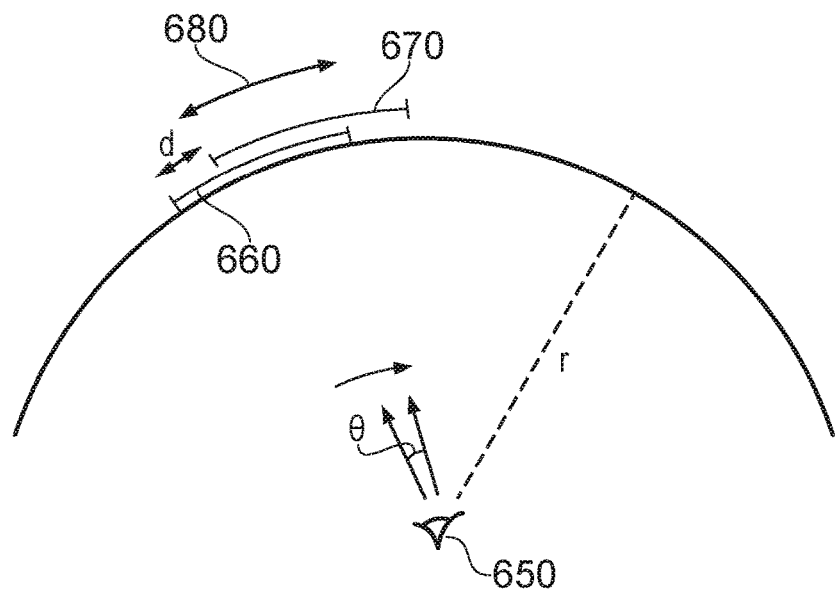
Figure 17:
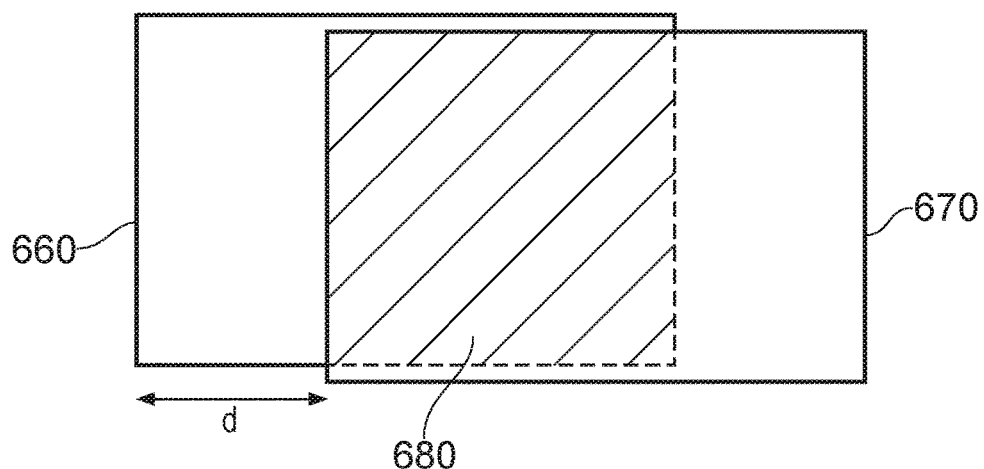
Figure 18:
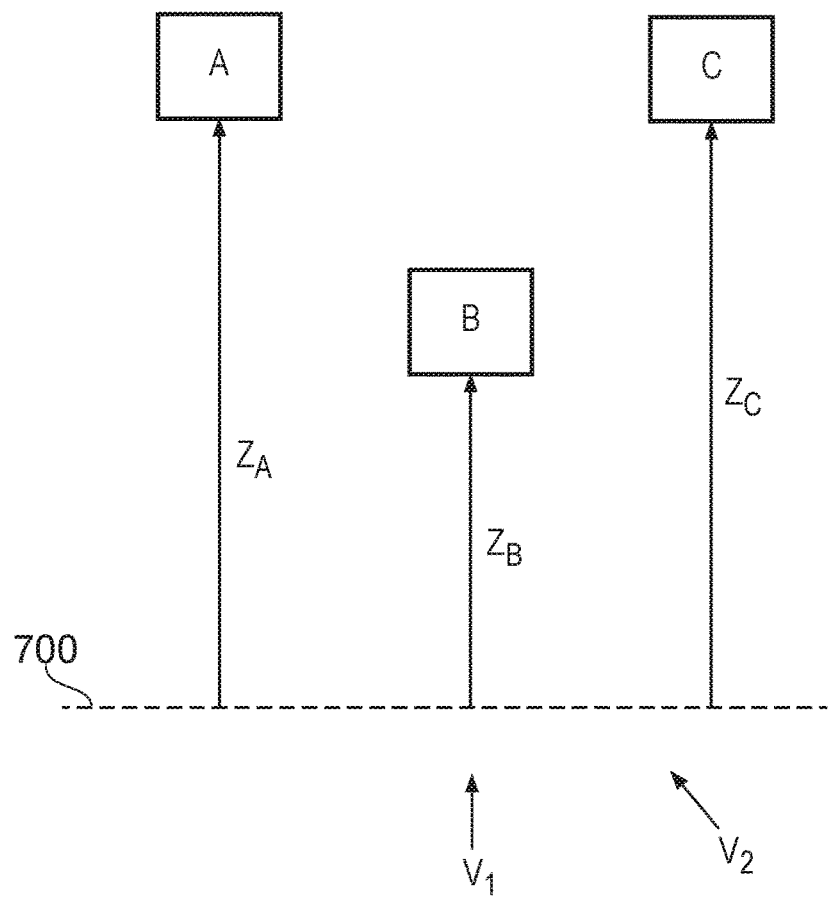
Figure 19:
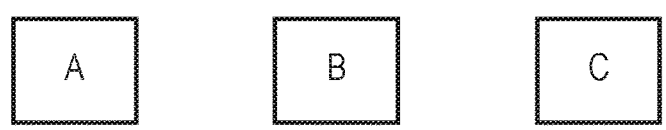
Figure 20:
Figure 21:
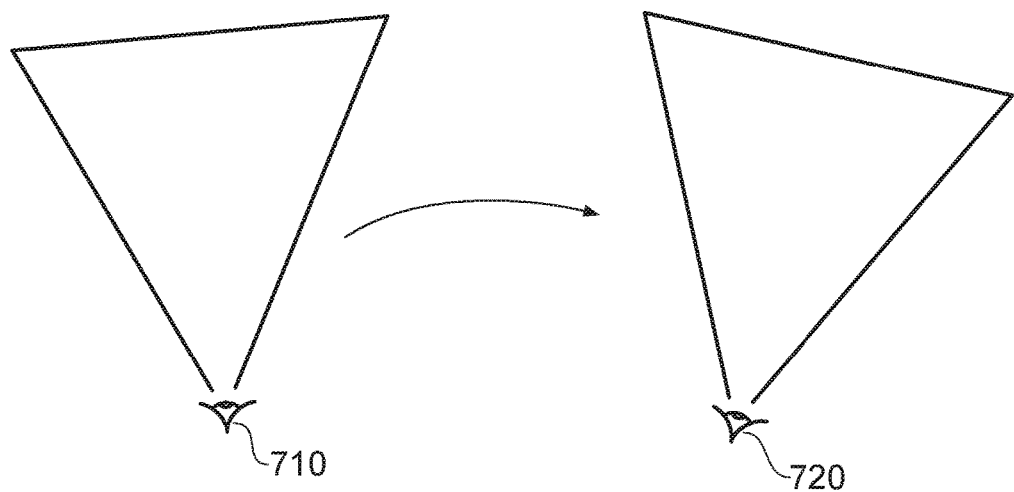
Figure 23:
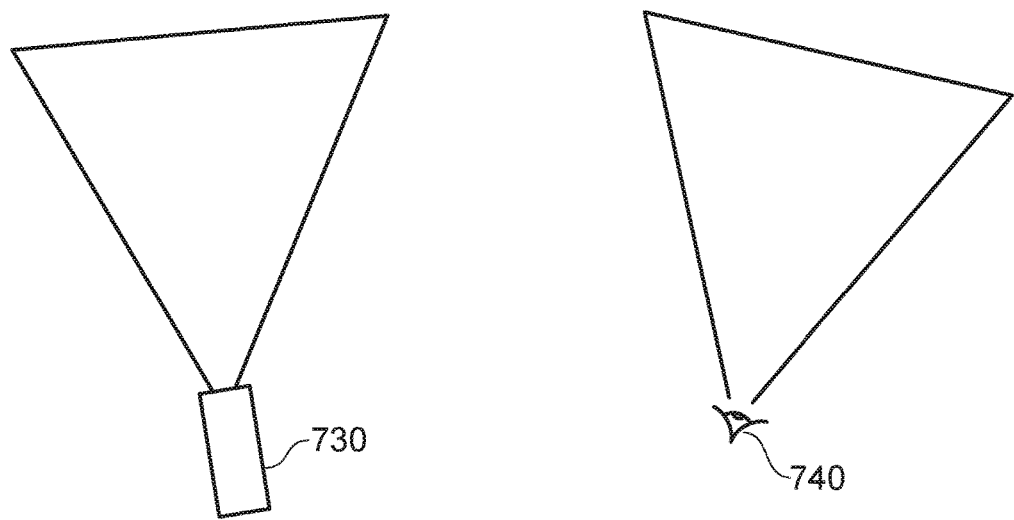
Figure 25:
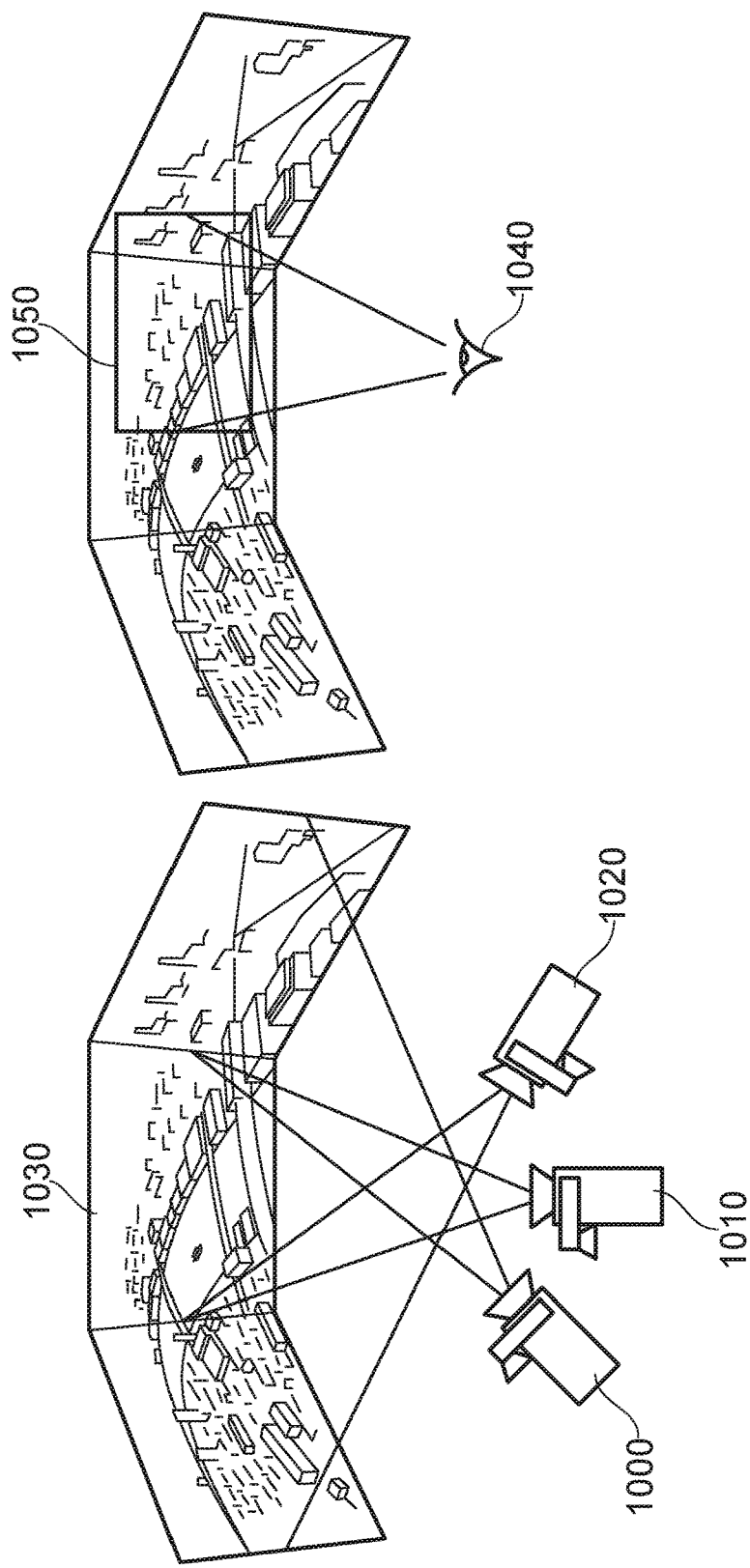
Figure 26:
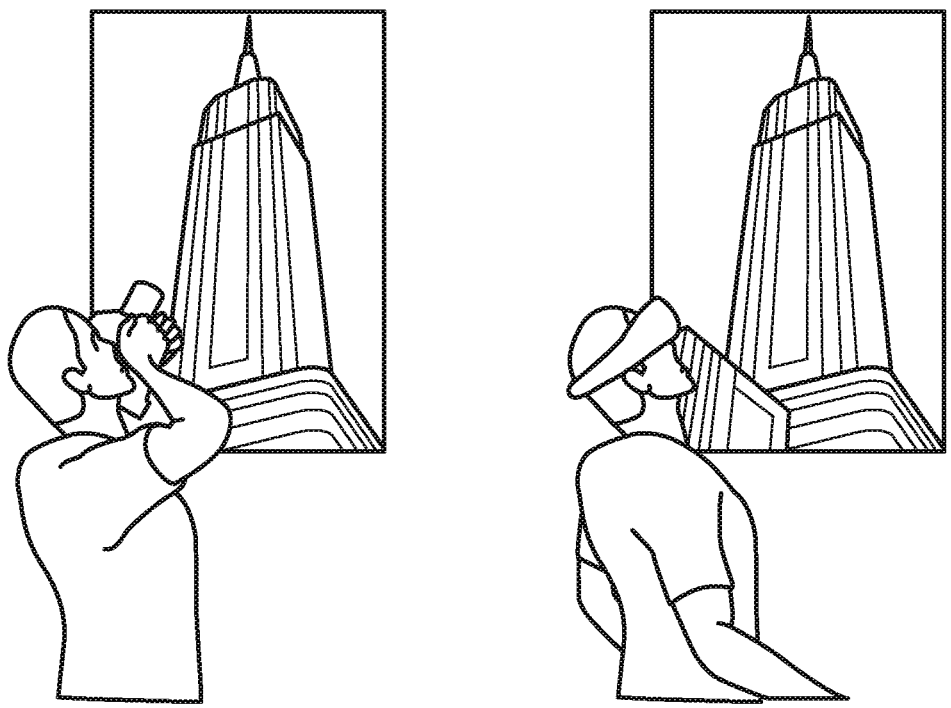
Figure 27:
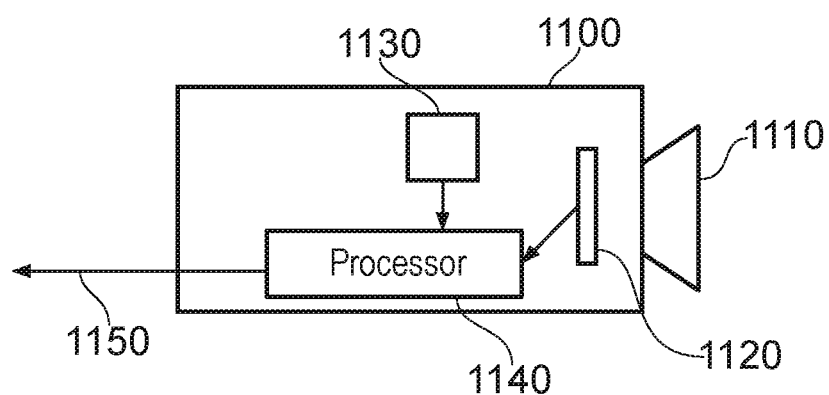
Figure 28:
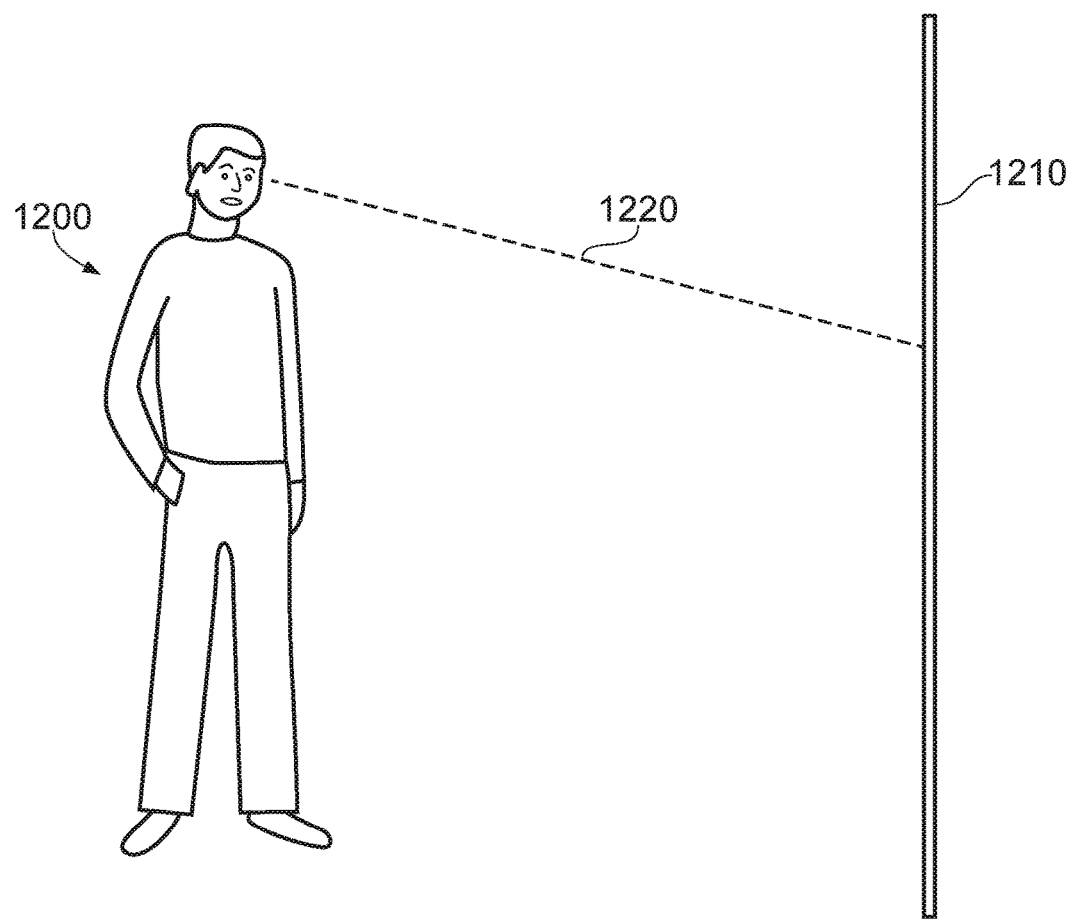
Figure 29:
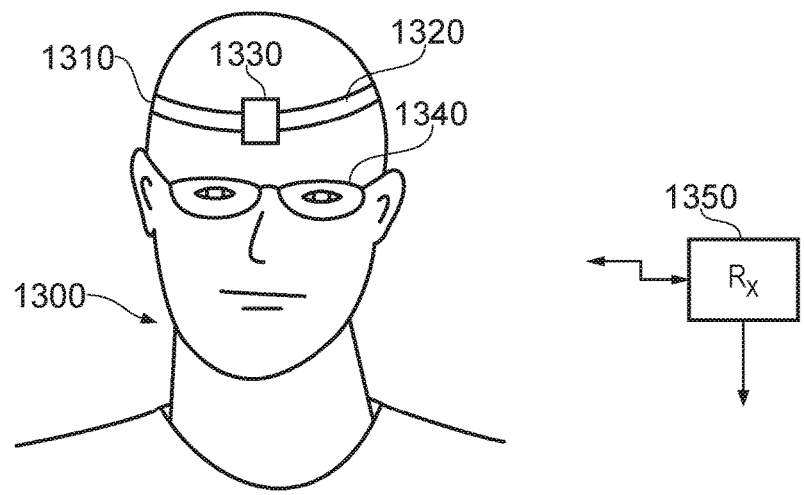
Figure 30:
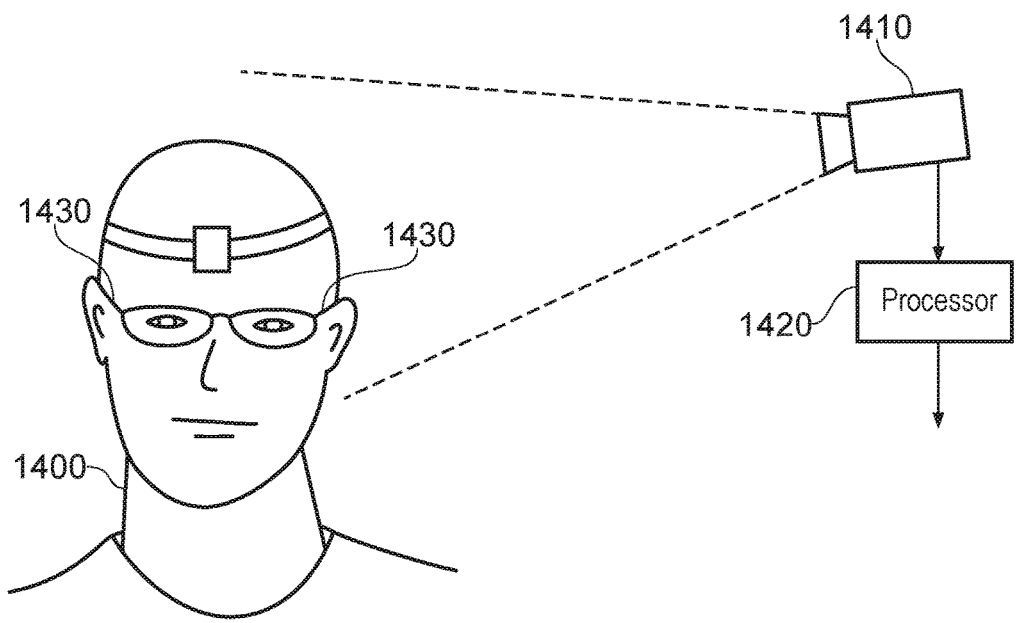
Figure 31:
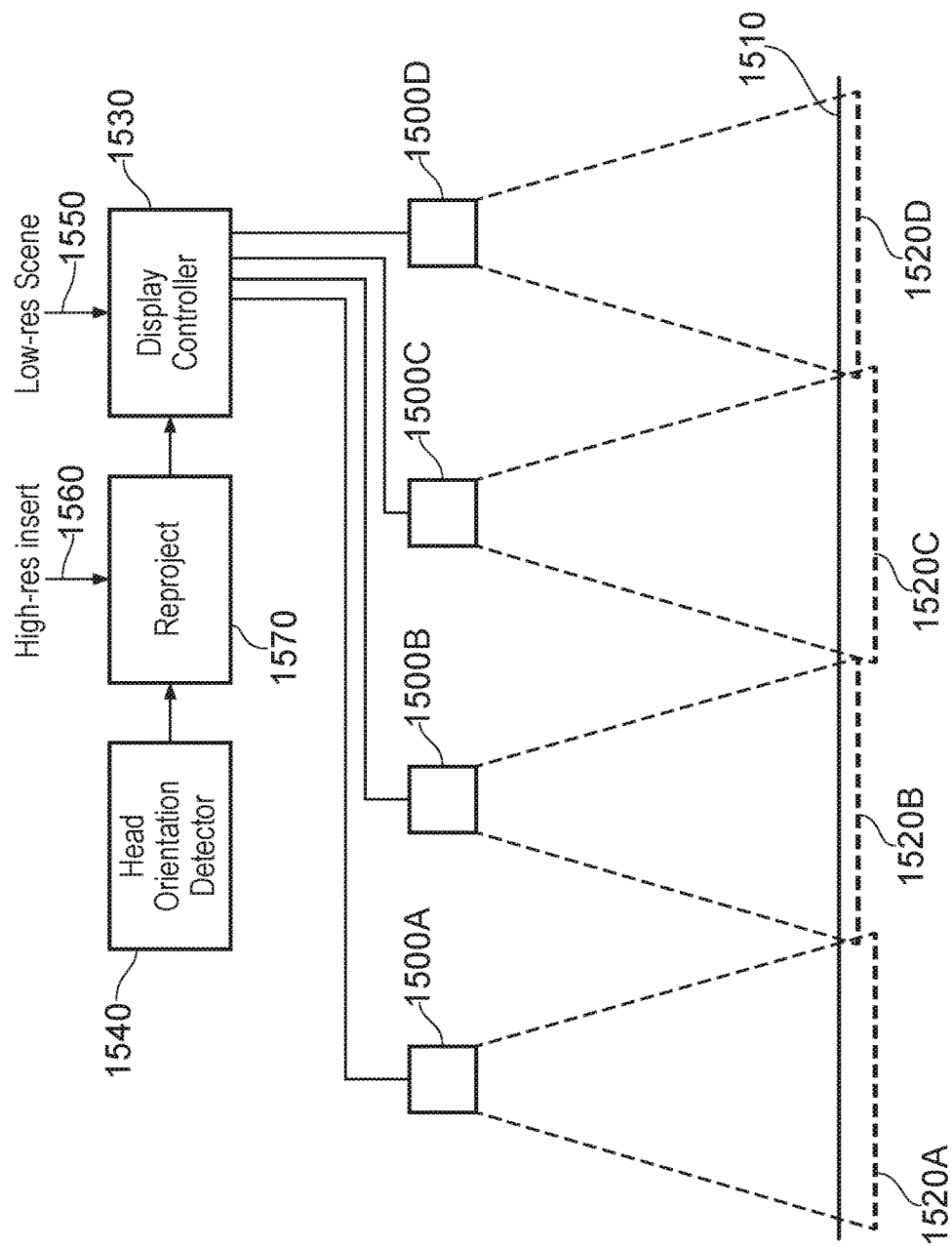
Figure 32:
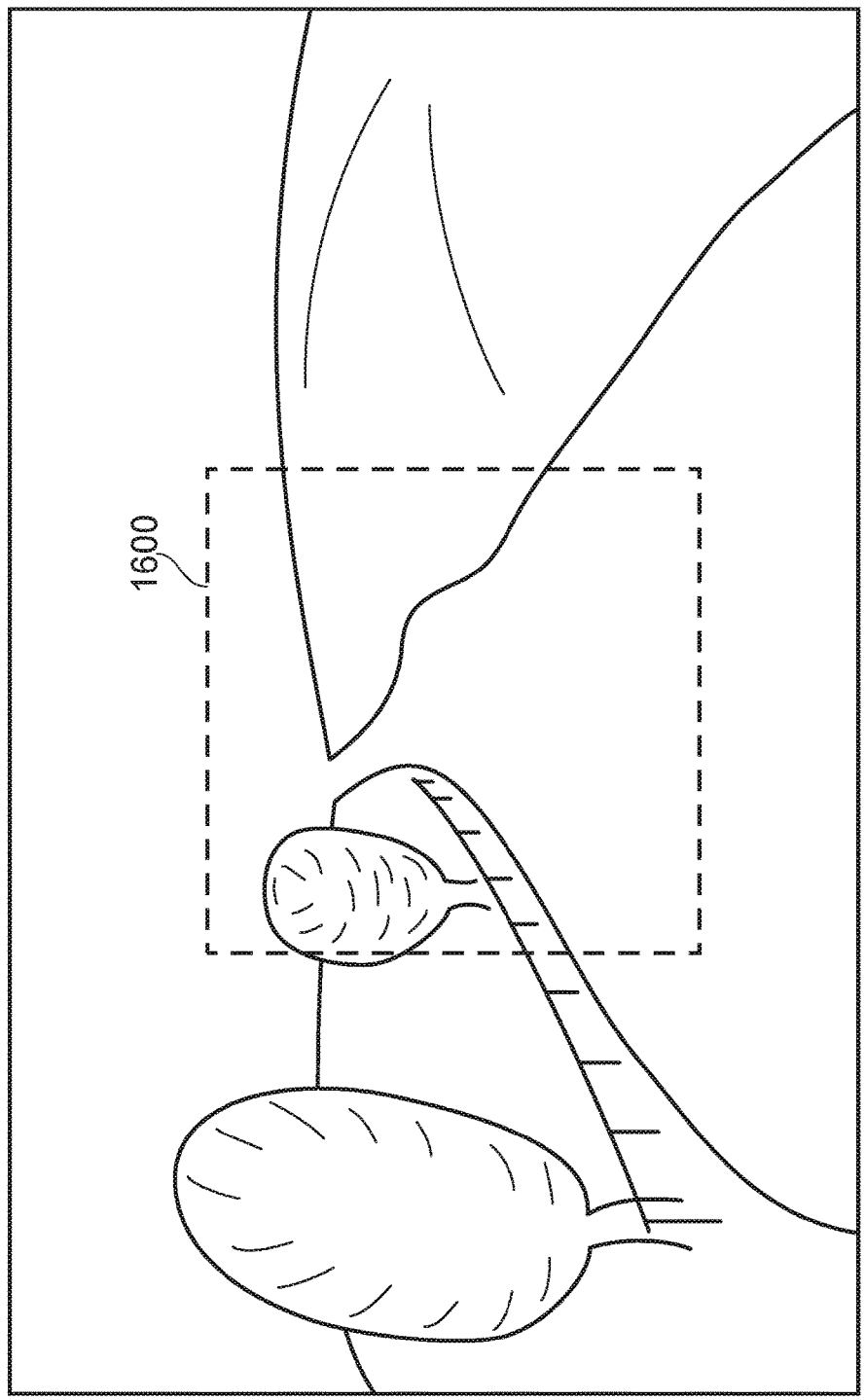
Figure 33:
Figure 34:
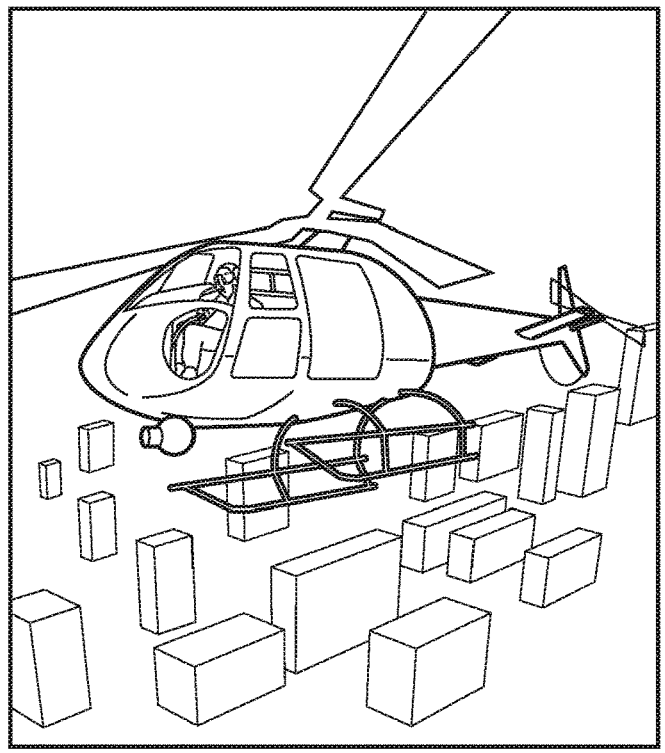
Figure 35:
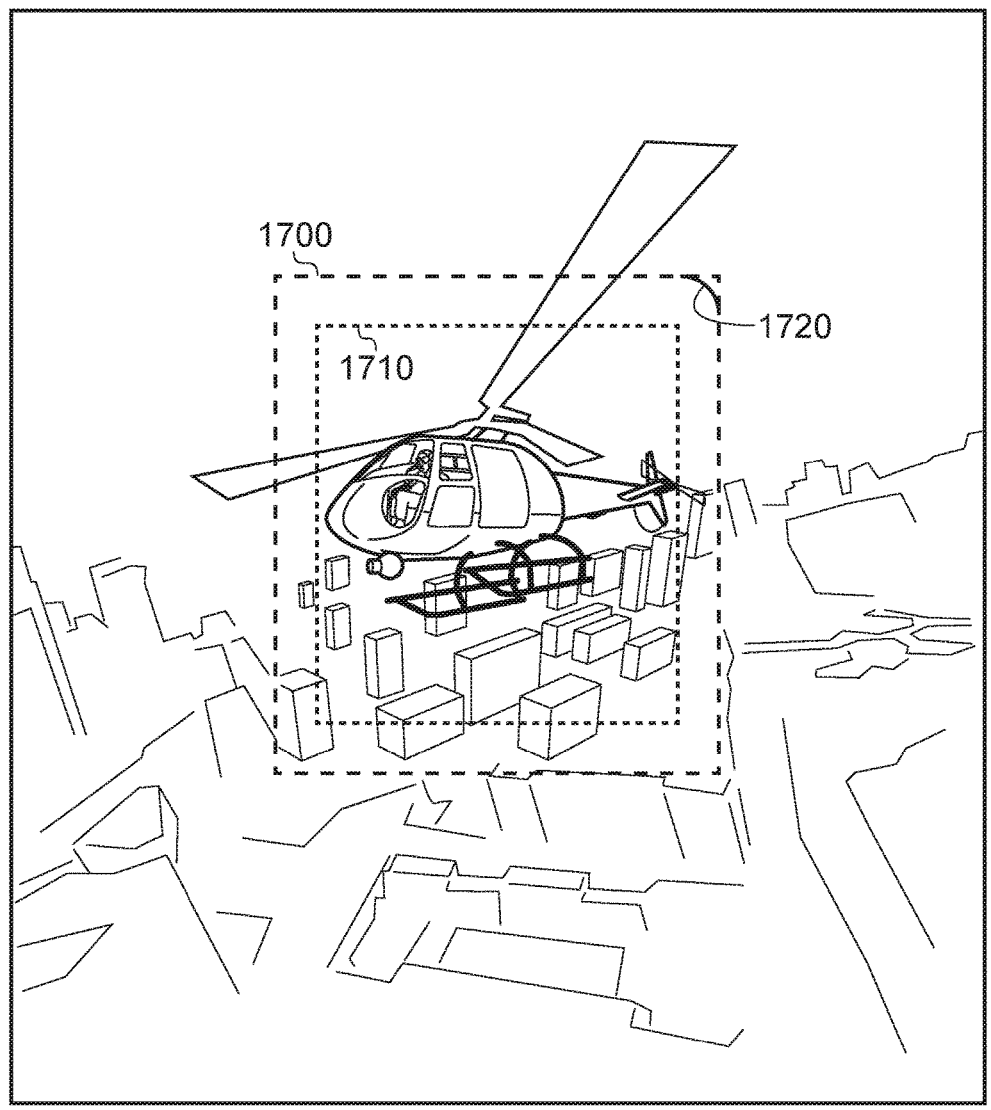
Figure 36:
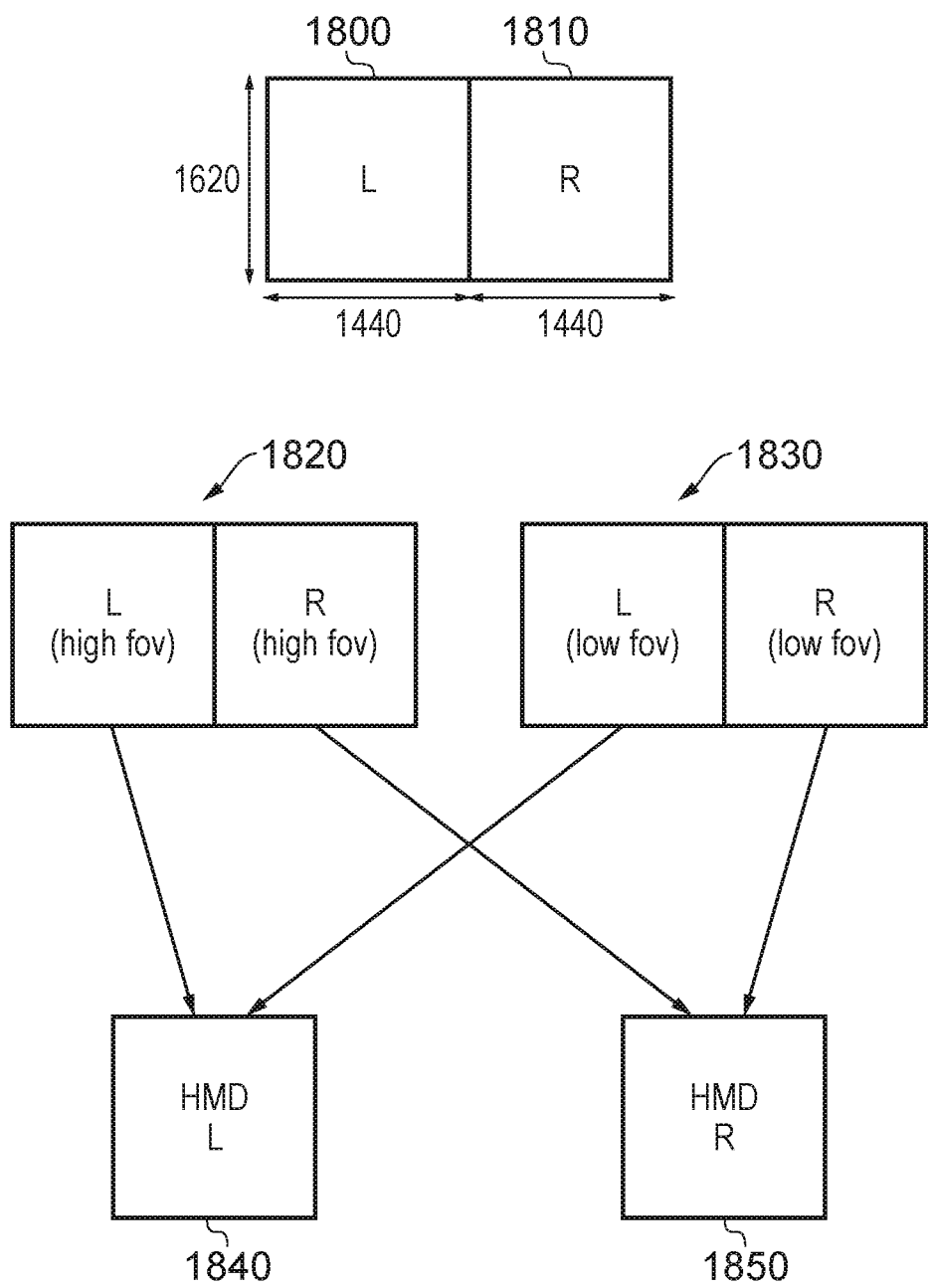
Figure 37:
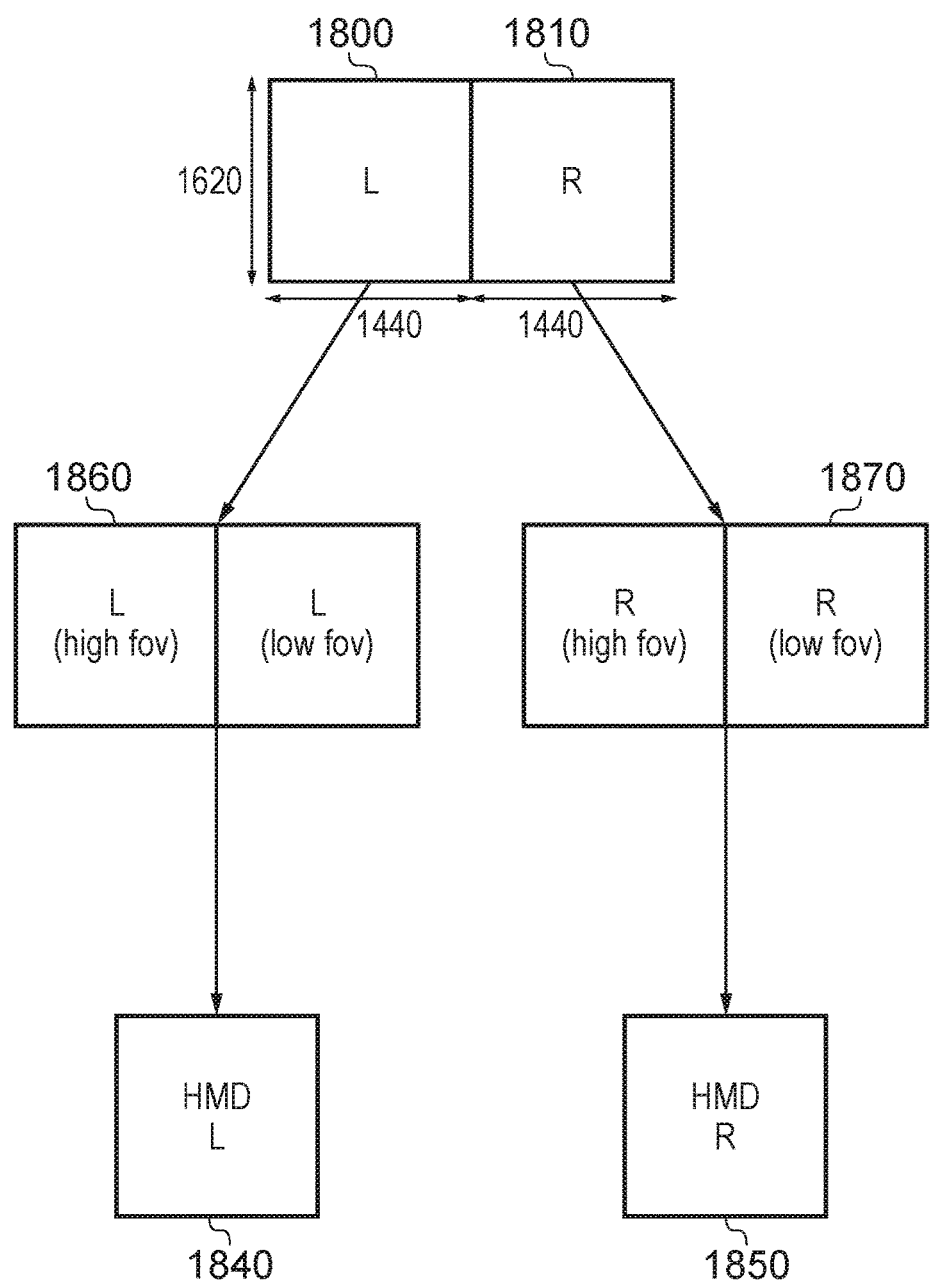
Figure 38:
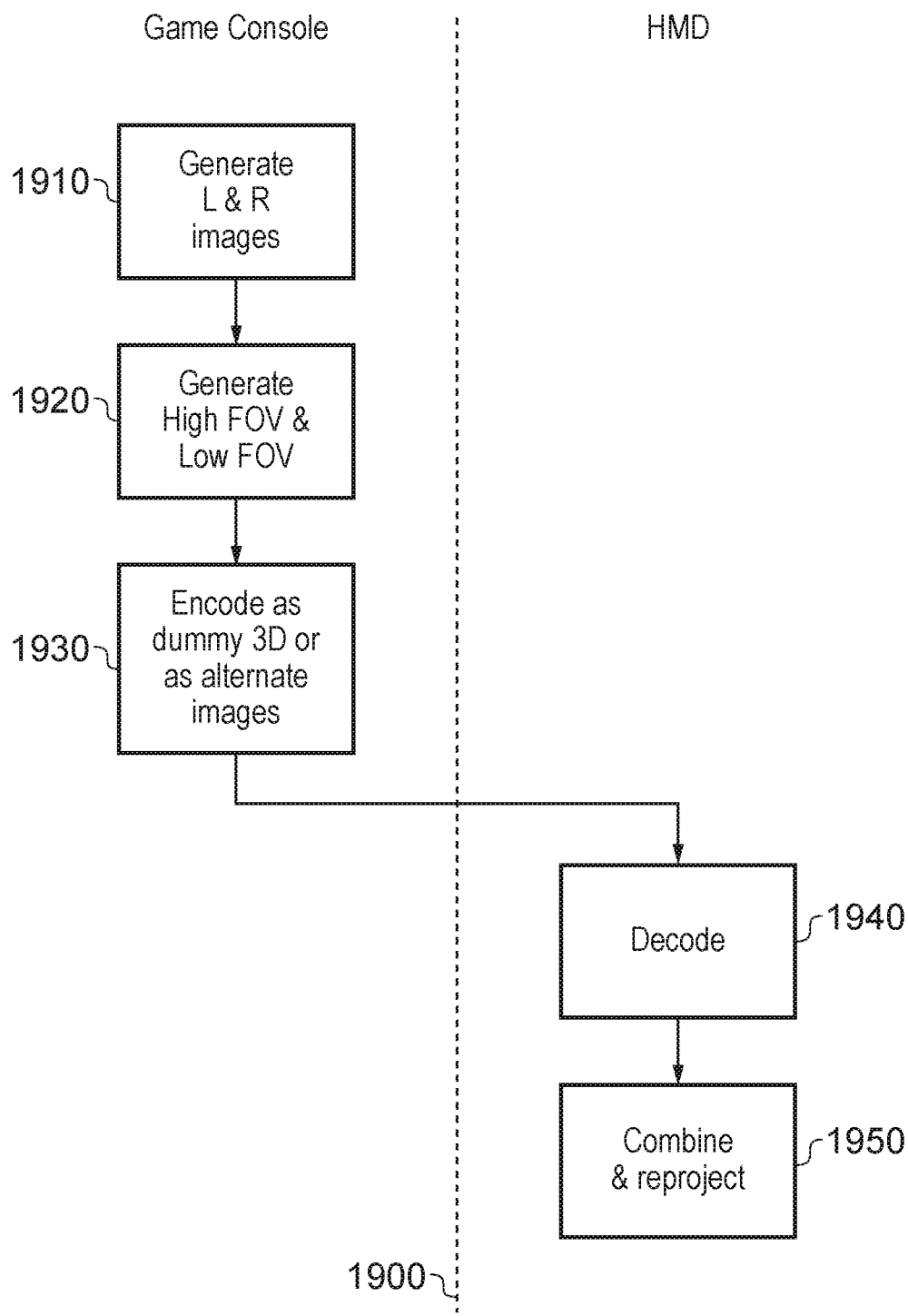
Figure 39:
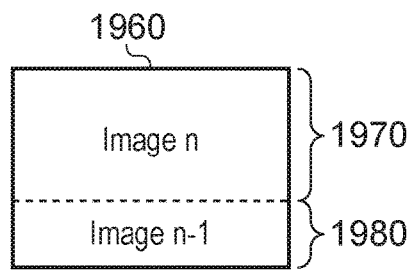
Figure 40:
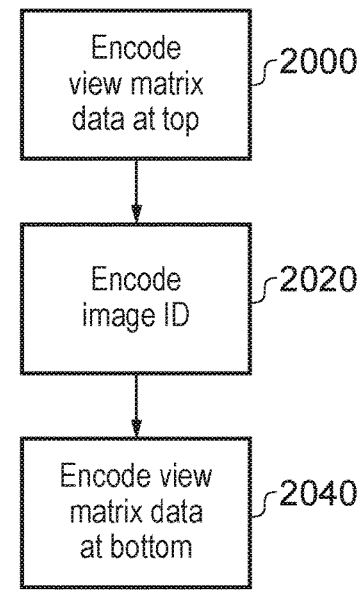
Figure 41:
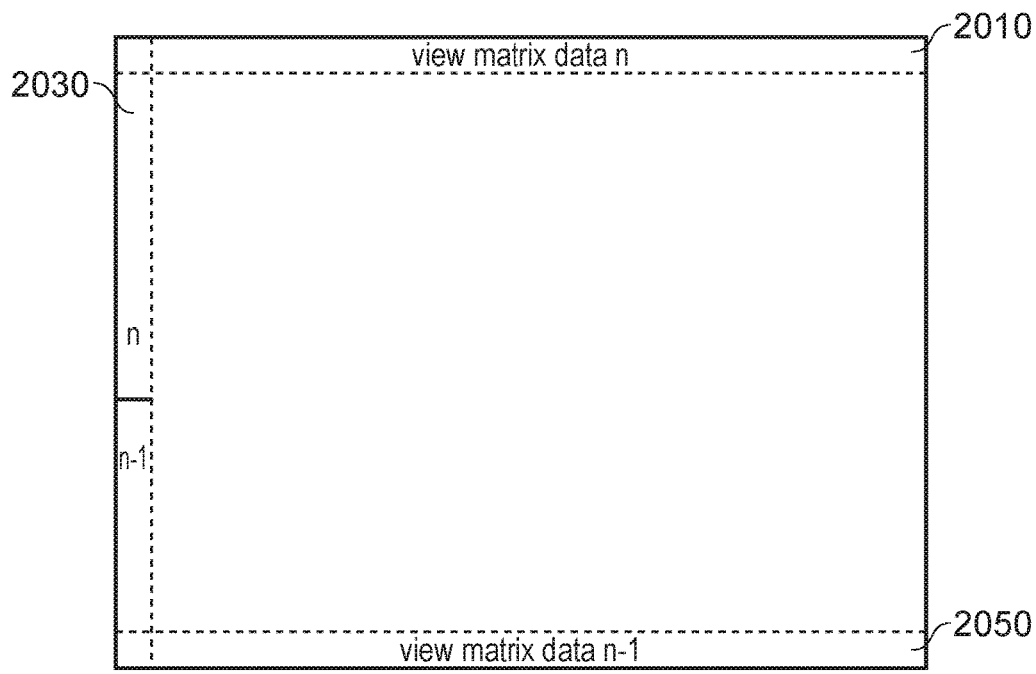
Figure 42:
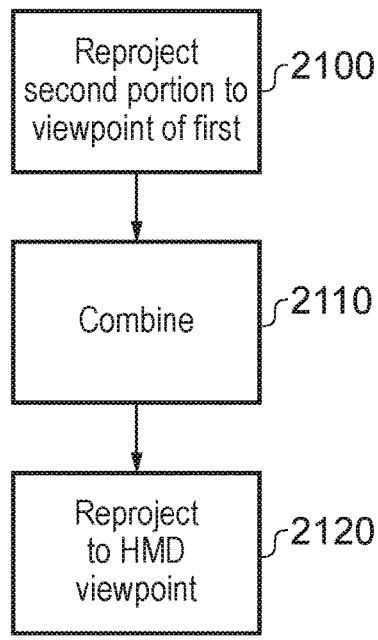
Figure 43:
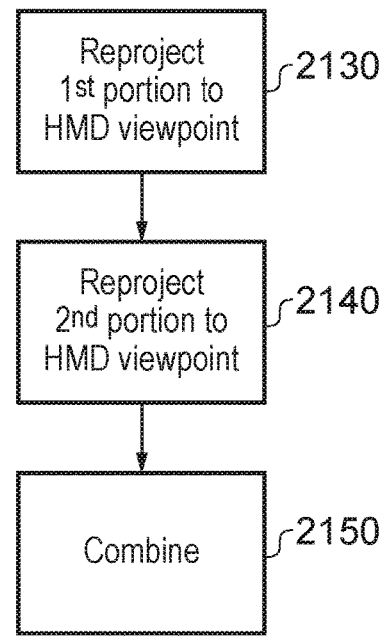
Figure 44:
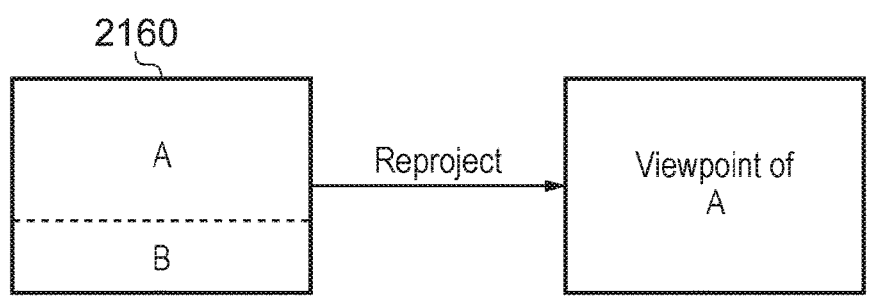
Figure 45:
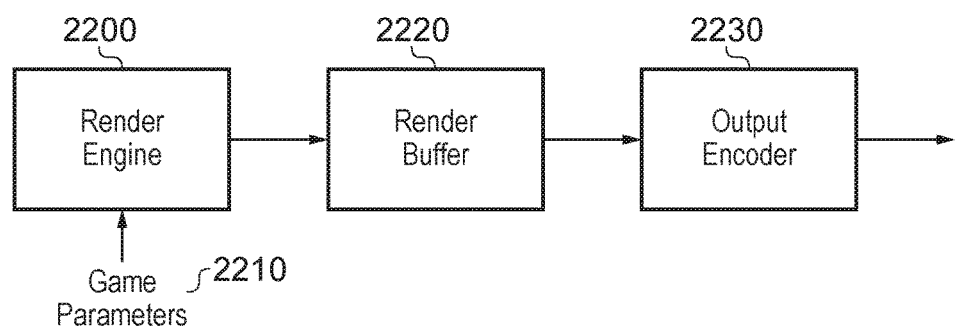

Embodiments of the invention will now be described with reference to the accompanying drawings, in which:

FIG. 1 schematically illustrates an HMD worn by a user;

FIG. 2 is a schematic plan view of an HMD;

FIG. 3 schematically illustrates the formation of a virtual image by an HMD;

FIG. 4 schematically illustrates another type of display for use in an HMD;

FIG. 5 schematically illustrates a pair of stereoscopic images;

FIG. 6 schematically illustrates a change of view of user of an HMD;

FIGS. 7a and 7b schematically illustrate HMDs with motion sensing;

FIG. 8 schematically illustrates a position sensor based on optical flow detection;

FIG. 9 schematically illustrates the generation of images in response to HMD position or motion detection;

FIG. 10 schematically illustrates the capture of an image by a camera;

FIG. 11 schematically illustrates the re-projection of the captured image;

FIG. 12 schematically illustrates an image rotation;

FIG. 13 schematically illustrates an image rotation and translation;

FIG. 14 schematically illustrates a latency issue with HMD image display;

FIG. 15 is a schematic flow chart illustrating an image processing technique;

FIG. 16 schematically illustrates the rotation of an HMD;

FIG. 17 schematically illustrates image position subtraction;

FIG. 18 schematically illustrates a depth map;

FIGS. 19 and 20 schematically illustrate images according to different respective viewpoints;

FIG. 21 schematically illustrates a technique for image rendering and re-projection to compensate for HMD motion;

FIG. 22 is a schematic flowchart relating to the technique shown in FIG. 21;

FIG. 23 schematically illustrates a technique for image capture and re-projection to compensate for different camera and HMD positions;

FIG. 24 is a schematic flowchart relating to the technique shown in FIG. 23;

FIG. 25 schematically illustrates the viewing of a panoramic image;

FIG. 26 schematically illustrates camera viewpoint adjustment in a displayed image;

FIG. 27 schematically illustrates a camera apparatus;

FIG. 28 schematically illustrates a viewer observing a display screen;

FIG. 29 schematically illustrates a user wearing a head orientation detector;

FIG. 30 schematically illustrates a passive head orientation detection technique;

FIG. 31 schematically illustrates a display arrangement using multiple screens;

FIG. 32 schematically illustrates an example of a display image;

FIGS. 33 and 34 schematically illustrate respective different field of view (FOV) versions of an image;

FIG. 35 schematically illustrates a combination of a high FOV image and a low FOV image;

FIG. 36 schematically illustrates the encoding of multiple FOV images as successive composite images;

FIG. 37 schematically illustrates the encoding of multiple FOV images as dummy 3D images;

FIG. 38 is a schematic flowchart illustrating operations involved in generating, encoding, decoding and using multiple FOV images;

FIG. 39 schematically illustrates a so-called frame tear;

FIG. 40 schematically illustrates a metadata encoding technique;

FIG. 41 schematically represents encoded metadata;

FIGS. 42 and 43 are schematic flow charts illustrating two different ways of combining images around a frame tear;

FIG. 44 schematically illustrates a re-projection process at a frame tear;

FIG. 45 schematically illustrates part of an image generator; and

Figure 46:
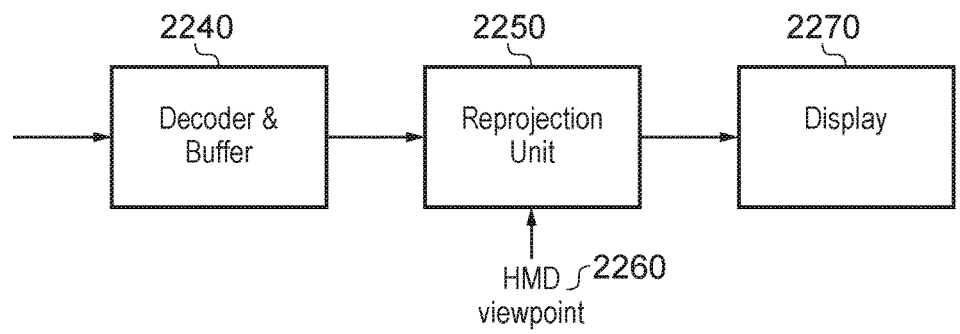

FIG. 46 schematically illustrates part of an HMD.

Embodiments of the present invention can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth (R) connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 15 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint need to track movements with respect to a real or virtual space in which the user is located.

This tracking is carried out by detecting motion of the HMD and varying the apparent viewpoint of the displayed images so that the apparent viewpoint tracks the motion.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

FIGS. 7a and 7b schematically illustrate HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 7a, a forward-facing camera 320 is provided on the front of the HMD. This does not necessarily provide images for display to the user (although it could do so in an augmented reality arrangement). Instead, its primary purpose in the present embodiments is to allow motion sensing. A technique for using images captured by the camera 320 for motion sensing will be described below in connection with FIG. 8. In these arrangements, the motion detector comprises a camera mounted so as to move with the frame; and an image comparator operable to compare successive images captured by the camera so as to detect inter-image motion.

FIG. 7b makes use of a hardware motion detector 330. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

FIG. 8 schematically illustrates one example of motion detection using the camera 320 of FIG. 7a.

The camera 320 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 320, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 330 such as an accelerometer. This can in fact give a faster response in respect of the indication of motion, given that the response time of the video-based system is at best the reciprocal of the image capture rate. In some instances, therefore, the detector 330 can be better suited for use with higher frequency motion detection. However, in other instances, for example if a high image rate camera is used (such as a 200 Hz capture rate camera), a camera-based system may be more appropriate. In terms of FIG. 8, the detector 330 could take the place of the camera 320, the image store 400 and the comparator 410, so as to provide an input directly to the motion detector 420. Or the detector 330 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

FIG. 9 schematically illustrates image processing carried out in response to a detected position or change in position of the HMD.

As mentioned above in connection with FIG. 6, in some applications such as virtual reality and augmented reality arrangements, the apparent viewpoint of the video being displayed to the user of the HMD is changed in response to a change in actual position or orientation of the user's head.

With reference to FIG. 9, this is achieved by a motion sensor 450 (such as the arrangement of FIG. 8 and/or the motion detector 330 of FIG. 7*b*) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

The image generator 480 may act on the basis of metadata to carry out various functions including re-projection, in a manner to be described below.

In order to illustrate schematically some of the general concepts associated with the present technology, FIG. 10 schematically illustrates the capture of an image by a camera and FIG. 11 schematically illustrates the re-projection of the captured image.

Referring to FIG. 10, a camera 500 captures an image of a portion 510 of a real-world scene. The field of view of the camera 500 is shown schematically as a generally triangular shape 520, such that the camera is at one apex of the generally triangular shape, the sides adjacent to the camera schematically indicate the left and right extremes of the field of view and the side opposite the camera schematically illustrates the portion of the scene which is captured. This schematic notation will be used in several of the following drawings.

To discuss the general concept of image re-projection, assume that in the arrangement of FIG. 10, not only the image is captured but also information defining a "view matrix" of the camera is also captured. Here, the view matrix may refer to the camera's position and/or orientation in space, either relative to a notional fixed point and orientation or expressed as changes with respect to the position and/or orientation applicable at a previous time (which may be the time associated with a preceding captured image, for example). So, in one expression, the view matrix could be considered as the x, y and z spatial position of the camera along with its rotational orientation expressed as yaw, pitch and roll (general terms indicative of three orthogonal rotational degrees of freedom) and its viewing frustum (a general term indicative of the field of view of the camera, ranging between a wide-angle field of view and a narrow angle or telephoto field of view, and which may be expressed as an angular range corresponding to, for example, the angle 530 shown in FIG. 10). The view matrix data need not comprise all of these data contributions. For example, in some arrangements, only a lateral rotational orientation (yaw) may be relevant. The choice of which data items to include within the view matrix data is therefore a matter for the system designer, taking into account the expected uses of the captured images and view matrix data.

In embodiments of the invention, the view matrix data is stored in association with the captured image, for example as so-called metadata which is stored and/or transmitted as part of the overall image data package, for example by a camera apparatus such as that described below with reference to FIG. 27 comprising an image capture device for capturing an image; a position and/or orientation detector for detecting the position and/or orientation of the camera apparatus at the time of capture of the image; and a metadata generator for associating metadata with the image, the metadata indicating the detected position and/or orientation of the camera apparatus at the time of capture of the image.

Note that the camera 500 may be a stills camera or a video camera capturing a succession of images, separated by time intervals.

FIG. 11 schematically illustrates the re-projection of the image captured by the camera of FIG. 10 according to a viewpoint of a viewer. The viewpoint 540 is schematically illustrated by an eye symbol and a generally triangular shape 550 which is similar to the triangular shape 520 discussed above. In order to display the image captured by the camera 500 so that it is appropriate for viewing according to the viewpoint shown in FIG. 11, a process is carried out which relates the view matrix (as discussed above) of the viewpoint to the view matrix of the camera 500. Examples of such techniques will be described with reference to FIGS. 12 and 13.

FIG. 12 schematically illustrates an image rotation from a first view matrix 560 to a second view matrix 570. Re-projection of this type involves simply rotating and scaling the image so as to correct for any differences in field of view and orientation between the view matrix of the camera and the view matrix of the user viewpoint. Examples of this type of re-projection will be discussed below with reference to FIGS. 16 and 17.

FIG. 13 schematically illustrates an image rotation and translation from a first view matrix 580 to a second view matrix 590. Here, the processing is slightly more involved, and may also use a depth map, indicating the image depth of different image features in the captured image, to allow the user viewpoint to be translated with respect to the viewpoint of the camera. Examples of the use of a depth map will be discussed below with reference to FIGS. 18-20.

Note that the images do not have to be camera-captured images. These techniques are all equally applicable to machine-generated images such as images generated by a computer games machine for displayed to the user as part of the process of playing a computer game.

FIG. 14 schematically illustrates a latency issue with HMD image display. As discussed above, the position and/or orientation of an HMD can be used, for example as discussed with reference to FIG. 9, so that an image for display is rendered according to the detected position and/or orientation of the HMD. In the case of viewing a portion of a wider captured image, or generating a required image as part of computer game play, the arrangement discussed with reference to FIG. 9 involves detecting the current position and/or orientation of the HMD and rendering an appropriate image for display.

However, the latency involved in this process can lead to an incorrect image being generated.

Referring to FIG. 14, consider a situation in which the user's viewpoint is rotating (in a clockwise direction as illustrated schematically in FIG. 14) from a first viewpoint 600 to a second viewpoint 610, over the course of a time interval of the order of an image repetition period of the image displays used in the HMD (for example, 1/25 second). Note that the two representations in FIG. 14 are shown side-by-side, but this is for the purposes of the drawing rather than necessarily indicating a translation of the user viewpoint (although some translation could be involved between the two viewpoints).

In order to allow time for the next output image to be rendered, the position and/or orientation of the HMD is detected when the HMD is at the viewpoint 600. The next image for display is then rendered, but by the time that image is actually displayed, the viewpoint has rotated to the viewpoint 610. The result is that the image is displayed is incorrect for the user's viewpoint 610 at the time that image is displayed. This can provide a subjectively poorer experience for the user, and may possibly lead to disorientation or even nausea on the part of the user.

Techniques which address this problem will now be discussed.

FIG. 15 is a schematic flow chart illustrating an image processing technique. The technique will first be discussed at a high level, and then more detail will be given below.

The features of the technique shown in FIG. 15 involve capturing or rendering an image (at a step of 620) according to the view matrix of the camera (in the case of a captured image) or the view matrix of the HMD (in the case of an image rendered by, for example, a computer game).

In the latter example, the image would be rendered according to the view matrix corresponding to the viewpoint 600 in FIG. 14. In other words, the technique involves detecting an initial position and/or orientation of the viewer's head and generating an image for display according to the detected position and/or orientation. The image is then transmitted or passed to the HMD along with metadata defining that view matrix (that is to say, the view matrix according to which the image was captured or first rendered). At the time of display, the HMD view matrix is again detected (in other words, detecting a current position and/or orientation of the viewer's head at a time at which the image is to be displayed) and, at a step 630, the image is re-projected based on the metadata indicating the original view matrix and the view matrix detected from the HMD at the time of display (in the terminology of FIG. 14, this would be the view matrix corresponding to the viewpoint 610, so that the technique involves associating metadata with the generated image, the metadata indicating the initial position and/or orientation of the viewer's head). So, the technique involves re-projecting the generated image according to any differences between the initial position and/or orientation and the current position and/or orientation of the viewer's head and displaying the re-projected image using the display.

In the case of a captured image, the view matrix of the camera is generally not within the control of the display arrangements and so this technique provides a way of compensating for differences between the two view matrices. In the case of image rendering, however, the issues are slightly different. However, a significant feature is that the time taken to process a re-projection operation can be much less than the time taken for a full rendering operation to generate an output image. In turn, this means that the rendering operation has to start earlier relative to the time of display which can lead to the latency problems with regards to detection of the appropriate viewpoint to use for the rendering operation, as discussed with reference to FIG. 14. By contrast, using the technique described with reference to FIG. 15, the rendering operation takes place relative to a viewpoint (such as the viewpoint 600) which is correct at the time that the rendering operation is initiated, but the viewpoint is then adjusted (to the viewpoint 610, for example) at the time of display. This avoids the need to try to predict the viewpoint 610 in advance, which could also lead to errors in the viewpoint, but provides an image for displayed to the user at the appropriate viewpoint corresponding to the display time. Accordingly, the technique can involve receiving an image and associated metadata, detecting a current position and/or orientation of the viewer's head at a time at which the image is to be displayed, re-projecting the received image according to any differences between the position and/or orientation indicated by the metadata and the current position and/or orientation of the viewer's head, and displaying the re-projected image.

Worked examples of this technique will be discussed below.

FIG. 16 schematically illustrates the rotation of an HMD viewpoint 650 in a clockwise direction.

FIG. 16 is similar to FIG. 6 discussed above, in that the image for display is considered to lie on the surface of a sphere of radius r, where r is substantially equal to the distance from the user's eye to the virtual image generated by the HMD display system. Under this arrangement, a rotation of the viewpoint 650 by an angle θ can be considered as a lateral movement on the surface of the sphere of radius r by a lateral distance d. Such a displacement d is schematically illustrated in FIG. 17. If it is assumed that an image generated at the step 620 is represented by an image 660 in FIG. 16, and an image generated at this step 630 is represented by an image 670 in FIG. 16, it may be seen that the two images may be represented side-by-side from the point of view of the user. (Note that in FIG. 17, a small vertical displacement is shown just to allow the different images to be distinguished from one another in the drawing).

In a simple example, in order to generate (at the step 630) an appropriate image 670 for display to the user, a "subtraction" operation is carried out, which is a schematic term to illustrate the operation of detecting the overlap between the required display position of the image 670 and the actual position of the image 660, so as to display within the image 670 the overlapping portion 680 (shaded in FIG. 17) of the image 660. In other words, the re-projecting comprises detecting an overlapping portion between the generated image and the required re-projected image, and reproducing the overlapping portion as part of the re-projected image.

In embodiments of the present invention, the missing areas in the image 670 (those parts not shown as shaded) may be masked or filled in using image data from, for example, a panoramic image captured or prepared for this purpose and stored by the display arrangement. So, embodiments of the technique can therefore comprise filling portions of the re-projected image other than the overlapping portion with image material from a further image source.

In order to re-project images by taking into account translations of the viewpoint, embodiments of the invention can use depth information associated with the images. FIG. 18 schematically illustrates a depth map which may be derived, for example, from image data captured by a 3-D (binocular) camera or a so-called Z-camera, or which may be generated as part of the operation of a computer games machine's rendering engine.

In the schematic example of FIG. 18, three image objects labelled as objects A, B and C, are shown at respective image depths measured from an arbitrary depth position 700 of $z_A$, $z_B$ and $z_C$. Two potential viewpoints are shown, labelled as a viewpoint $v_1$ and a viewpoint $v_2$ respectively.

FIGS. 19 and 20 schematically illustrate portions of images according to the viewpoint $v_1$ and the viewpoint $v_2$ respectively. At a rendering stage, the depth of each of the image objects is taken into account in generating the images. However, this technique can also be used at a re-projection stage such as that defined by the step 630 discussed above, so that image objects may be moved relative to one another in the re-projected image according to their respective image depths. Accordingly, the technique can involve providing depth data indicating the image depth of one or more image features, and the re-projecting can comprise repositioning one or more image features within the re-projected image according to the depth data.

FIG. 21 schematically illustrates a technique for image rendering and re-projection to compensate for HMD motion. In a similar manner to FIG. 14, a user viewpoint moves or rotates from a viewpoint 710, detected as part of the step 620 of FIG. 15, to a viewpoint 720 detected as part of the step 630 of FIG. 15 and according to which the image for display is re-projected. In this way, an image according to the correct viewpoint 720 is displayed to the user.

In more detail, FIG. 22 is a schematic flowchart relating to the technique shown in FIG. 21. In FIG. 22, process steps 800, 810, 820, 830, 840 and 850 are shown. Of these, the steps 800, 810 and 820 correspond generally to the step 620 of FIG. 15. The remaining steps 830, 840 and 850 correspond generally to the step 630 of FIG. 15.

At the step 800, the current position of the HMD (corresponding to the position 710 of FIG. 21) is detected and, at the step 810, is stored (for example in a temporary working memory forming part of the HMD or the computer games machine). At the step 820, an image for display is rendered according to the viewpoint 710.

At the time at which the rendered image is to be displayed, or at a time interval t before the instant at which the image is to be displayed, where t is the length of time required for the re-projection operation, the HMD position is again detected at the step 830 which, in this example, will detect the position 720. The image for display is re-projected as discussed above at the step 840 and is displayed to the user at the step 850.

A similar example relating to captured images will now be discussed. FIG. 23 schematically illustrates a technique for image capturing and re-projection to compensate for different camera and HMD positions. In FIG. 23 a camera viewpoint 730 is different to an HMD viewpoint 740.

FIG. 24 is a schematic flowchart relating to the technique shown in FIG. 23.

In FIG. 24, process steps 900, 910, 920, 930, 940 and 950 are shown. Of these, the steps 900 and 910 correspond generally to the step 620 of FIG. 15. The remaining steps 920, 930, 940 and 950 correspond generally to the step 630 of FIG. 15.

At the step 900, the current position of the camera (corresponding to the position 730 of FIG. 23) is detected and, at the step 910, is transmitted as metadata along with the captured image.

At the time at which the image is to be displayed, or at a time interval t before the instant at which the image is to be displayed, where t is the length of time required for the re-projection operation, the HMD position is detected at the step 920 which, in this example, will detect the position 740. The image for display is re-projected as discussed above at the step 930 and is rendered (at the step 940) for display to the user at the step 950.

FIG. 25 schematically illustrates the viewing of a panoramic image 1030 formed by combining or stitching together images captured by respective cameras or camera positions 1000, 1010, 1020. Note that real cameras do not have to be involved; the panoramic image could be formed by stitching together multiple computer-generated images having different respective viewpoints. The viewpoint of each of the cameras, camera positions or virtual cameras used to capture the panoramic image is associated with the panoramic image or the respective image portion corresponding to that viewpoint as image metadata, in a similar manner to the step 910 discussed above. At the time of display, according to a user viewpoint 1040, an image 1050 for display is generated by re-projecting the respective image portions or the whole panoramic image according to the techniques discussed above.

FIG. 26 schematically illustrates camera viewpoint adjustment in a displayed image, which can allow images to be reproduced at their original size and position relative to the viewer. The left side of FIG. 26 schematically illustrates a user capturing an image of (in this example) a tall building using a hand-held camera. As discussed above, the camera viewpoint is recorded and associated with the captured image as metadata. To the right of FIG. 26, a user is viewing the captured image by an HMD. The captured image is re-projected according to the user's viewpoint using the techniques discussed above.

The data-processing operations described above may be carried out at the video signal source 80 (for example, a computer games machine) and/or the HMD (in terms of all of the steps of FIG. 22 and the steps 920 ... 950 of FIG. 24). The division between processing at the HMD and processing at the source 80 is a matter for the system designer; it may be desirable to reduce the size, weight and power consumption of the HMD for user comfort, which would make it appropriate to move as much processing as possible to the source 80. Alternatively, in order to reduce the amount of data which needs to be transferred between the HMD and the source 80, some of the processing may take place entirely at the HMD. In either instance, the processing may be carried out by appropriate programmable hardware operating under software control, for example. The steps 900, 910 of FIG. 24 may be carried out by a camera or (in a similar manner to the discussion above) by apparatus associated with a camera. For the purposes of example, FIG. 27 schematically illustrates a camera 1100 having this functionality. In FIG. 27, the camera 1100 comprises a lens arrangement 1110, an image sensor 1120 arranged to receive light through the lens arrangement 1110 and convert the light into an image signal, a position, orientation and/or motion detector 1130, which may be of the types discussed above in connection with detecting the HMD's position, orientation and/or motion, and a processor 1140 operable to carry out at least the steps 900, 910 using data from the detector 1130 and to output an image signal 1150 having associated viewpoint metadata as discussed above. Note that if optical flow motion detection is used as described earlier, the image data for this process may be simply derived from the sensor 1120, so avoiding the need for a separate detector 1130.

According to at least some embodiments of the present invention, by the addition of extra data in a video signal, an immersive video display such as a head-mounted display (HMD), or multi-screen projector is capable of reproducing images life-sized and in their correct orientation to the viewer. For interactive applications, the image re-projection can be performed rapidly and at the latest time just before display. This can reduce unwanted image movement caused by rendering latency. For any application, this technique can stabilise camera motion reducing viewer sickness and maintains the real world orientation of objects, improving immersion and realism.

In at least some embodiments of the invention, a single HMD could be used to re-project both interactive content and broadcast TV signals using the same technology. Some frame borders may be seen if the viewer is looking in a different direction to the camera, though this could be mitigated using supplementary panoramic still images to fill the gaps.

Embodiments of the invention can also address issues relating to video captured by a shaky camera, for example by a hand-held camera or a camera subject to outside influences on its motion, such as a camera mounted on a mechanical device or in the path of wind currents. By associating metadata with the image (as discussed above) indicative of the motion of the camera during image capture, re-projection is performed at the time of display using the techniques described above. In this way, a central region of the image can be compensated for camera motion and appear steady to the viewer, though the outer border of the image may move around as a result of the compensation.

The embodiments described so far have related primarily to head mountable displays. Further arrangements will now be described in which the display or displays are not head mountable.

FIG. 28 schematically illustrates a viewer 1200 observing a display screen 1210. The display screen 1210 may be a forward-projection screen (in which case one or more projectors, not shown, may be positioned on the same side of the screen 1210 as the user), or a rear-projection screen (in which case one or more projectors, not shown, may be positioned on the other side of the screen to that of the user) or formed as one or more display panels such as liquid crystal display (LCD) panels. The skilled person will understand that the particular technology used to implement the display of images on the display screen 1210 is not material to the present embodiments.

Many of the techniques discussed above in connection with HMD devices can also be used equivalently in respect of the arrangement of FIG. 28. In the earlier discussion of HMD systems, the orientation of the HMD was detected by various techniques. A similar consideration in the arrangement of FIG. 28 involves the detection of the user's head orientation. It will be appreciated that the head orientation does not necessarily indicate the direction that the user is looking, but it is generally considered to indicate a good approximation of the direction of viewing 1220.

So, in some embodiments, the same techniques as discussed above (in connection with HMD systems) can be used in respect of a larger display 1210 and a detection of the user's head orientation. Various ways in which the head orientation can be detected will be discussed below.

FIG. 29 schematically illustrates a user 1300 wearing a head orientation detector 1310. The head orientation detector 1310 is illustrated schematically as a headband 1320 and an orientation detector 1330 mounted on the headband. In practice, the arrangement could be made more discreet, for example been combined into a fitment attachable to a conventional pair of spectacles 1340 or forming part of a hat or pair of headphones.

Functionally, the orientation detector 1330 operates according to the techniques shown in FIG. 8 if all the various alternatives discussed earlier in connection with the description of FIG. 8. In this regard, the orientation detector 1330 encompasses much of the functionality of an HMD, but without the image display function.

The orientation detector 1330 may comprise a processor to derive an orientation from whichever data source it is using (for example, images of the ambient scene or accelerometer data), so that the orientation detector 1330 transmits data indicative of the orientation to a receiver 1350, for example by a wireless link such as a Bluetooth link. Of course, a wired link could be used instead. Alternatively, the orientation detector 1330 may transmit "raw" acquired data, such as captured images of the surroundings or raw data from an accelerometer to the receiver 1350, so that the receiver 1350 (or a further downstream processing device, not shown) derives orientation information from the raw data received from the orientation detector 1330.

FIG. 30 schematically illustrates a passive head orientation detection technique. This arrangement does not necessarily require the user in 1400 to wear or carry any particular equipment or items. A video camera 1410 captures images of the user 1400 and passes the images to a processor 1420. The processor 1420 can operate in various ways. In one example, the processor 1420 can apply known face-detection techniques to detect the orientation of the news's face with respect to the camera 1410. For example, such techniques may involve comparing an image portion containing the user's face (normalised to a standard scale) to various Eigen images each indicative of characteristics of a face at a different orientation relative to the camera. The closest match amongst the Eigen images may be taken to be indicative of the current orientation of the user's face. The processor 1420 may be calibrated with information defining the relative orientation of the camera 1410 and the display screen in use, so as to be able to provide an output which is indicative of a current orientation of the user's face relative to the display screen.

In another example, the user may wear one or more passive markers such as a reflective or retro reflective marker (not shown in FIG. 30) to assist the processor 1420 in the detection of the orientation of the user's face relative to the camera. For example, if the side arms 1430 of the user's spectacles were provided with different (that is to say, distinguishable by the camera 1410) reflective markers, the relative size in the captured image of the respective markers could be processed to provide an indication of the orientation of the user's face. Optionally, the camera 1410 may comprise a source of illumination arranged to eliminate the markers. Optionally, the illumination may be invisible or substantially invisible to the user, for example infrared illumination.

FIG. 31 schematically illustrates a display arrangement using multiple projectors.

In FIG. 31, four projectors are provided by way of example, namely projectors 1500A, 1500B, 1500C and 1500D. The projectors have respective fields of view which together encompass the whole of the display screen 1510. The respective fields of view are indicated schematically by respective dashed lines 1520A-D which, for the sake of the drawing, are shown behind the projector screen. In fact, of course, the important area to consider is the extent of the projection at the plane of the projector screen 1510.

The four projectors are driven by a display controller 1530 which provides a respective display signal to each of the projectors 1500 A-D. The formation of the signals will now be discussed.

With reference to a viewer (not shown in FIG. 31) observing the display screen 1510, a head orientation detector 1540 is arranged to detect the orientation of the viewer's head with reference to the display screen 1510. The various techniques discussed above are suitable for this detection. Also as discussed above, this provides an indication of the direction in which the viewer is looking. The aim of the system shown in FIG. 31 is that a lower-resolution background scene provided by an image signal 1550 is displayed across the whole of the display screen 1510, but a higher resolution insertion image provided by an image signal 1560 is superimposed so as to replace a part of the lower resolution background scene. (If the viewer's head orientation is not detected, a fixed head position—not uncommon in a simulator environment—could be assumed)

An example is schematically illustrated in FIG. 32, which might form part of a video or a videogame relating to driving along a road surrounded by trees (shown very schematically in FIG. 32). Here, a background scene is generated and displayed at a lower resolution than an insertion image 1600 which is generated and displayed at a higher resolution. The insertion image 1600 relates to parts of the overall scene which the user will be concentrating on, namely (in this example) the road immediately ahead and any oncoming vehicles. The remaining background image (after insertion of the insertion image) relates to other parts of the overall scene which are less important to the user's attention. One reason why this disparity in image resolution is used is because of the high processing overhead in generating an overall scene covering the entire display at a high resolution. Instead, the background may be generated at a lower resolution (and may be arranged so as to change less frequently than the insertion image) so as to save on processing overhead.

Note that the dashed lines indicating the extent of the insertion image 1600 are simply for clarity of the drawing and would not be present in an actual displayed image.

Returning to FIG. 31, the insertion image represented by the signal 1560 is re-projected by re-projection logic 1570 at an appropriate image display position according to the detected head orientation of the viewer. The re-projected insertion signal is supplied to the display controller which combines it at the appropriate display position with the lower resolution background scene represented by the signal 1550.

A similar arrangement to that of FIG. 31 could refer to television coverage of a sports event or the like. The background display could be, for example, an image of an entire sports pitch (although not necessarily all of the sports pitch may be displayed at one time to the user). the insertion image to be re-projected into the main display is a shot from a camera which is following the sports action, for example, movements of a player. The insertion image is re-projected to the appropriate position in the background image using the metadata and techniques described above. This provides the viewer with an indication of where, in the context of the whole pitch, the action is taking place.

Embodiments of the present invention could use non-changing parts (or parts of a certain colour or texture, perhaps representing a view of grass) of the re-projected image to populate the background image as the re-projected image moves around as part of the above process. In some examples, a low resolution background image could be populated with higher resolution image material representing the sports pitch by copying from the re-projected image as it moves around. If multiple camera views are available (as is the case with some broadcasters' coverage of sporting events and the like) then (a) the user could select one or more such views to be re-projected, and (b) this would allow a faster population of the background image, by taking material from more than one such view.

In other examples, if a depth map or other depth data were provided with the background and insertion images, the user could move around the overall scene in three dimensions, with re-projection being adjusted in response to the user's virtual position.

A further example relates to a video game, such that the overall background image could represent some or all of a virtual world. The scene relating to specific game action by a player is re-projected into the correct position within the virtual world as the insertion image.

FIGS. 33 and 34 schematically illustrate respective different field of view (FOV) versions of an image.

The underlying principle behind the system which will now be described involving multiple FOV versions of an image is that many images, particularly in the context of videogames, have a point or region of main interest. In order to achieve a subjectively attractive image for the user, but without the prohibitive bandwidth requirements of transmitting the entire image at a very high resolution, the techniques to be described below involve providing two versions of an image.

A first version, such as that shown in FIG. 33, provides a particular resolution (for example, a high-resolution of perhaps 720 or more video lines) representation of the whole image. This representation is referred to as a large or high FOV image, because the FOV of the image encompasses (for example) the entire originally rendered image.

Another version, such as that shown in FIG. 34, has a lower or smaller FOV so not all of the originally rendered image is included. Instead, a region of interest is represented. In the example of FIG. 34, the region of interest relates to the cabin and fuselage of the helicopter but in general terms, in a videogame situation, the region of interest would normally relate to a region surrounding the player's character in the videogame or, in the case of a "first person viewpoint" videogame, the region surrounding the most significant or currently most dangerous enemy by (for example) a predetermined margin distance. Other systems (apart from videogames) may also have a region of interest which is identifiable in an automated fashion. For example, a video commercial may have associated metadata defining an image location of a product of interest. Or, in the case of an HMD, eye tracking may be used to detect which part of the image the user is currently looking at, such that the identified part of the image (whatever image material or content it contains) is treated as the region of interest. A default might be that the region of interest is a centrally located region of the higher FOV image. Note that in at least some embodiments, the HMD position and/or orientation is already being used (as part of the two-stage re-projection process discussed with reference to FIGS. 22 and 24) as metadata to influence the generation of each image, so the transmission and use of eye position metadata to influence the encoding of the rendered image into high and low FOV portions is not an excessive processing burden.

The image of FIG. 34 may be provided at the same basic resolution as the image of FIG. 33, for example a high-resolution of 720 or more video lines. But because the FOV of the image of FIG. 34 is smaller than the FOV of the image of FIG. 33, each particular image feature represented in the image of FIG. 34 is represented at effectively a higher resolution than the corresponding representation of that feature in the image of FIG. 33.

The two images (FIG. 33 and FIG. 34) provide an image pair representing the same underlying scene or rendered image, but in two different ways. This is an example of two or more such images.

FIG. 35 schematically illustrates a combination of a high FOV image and a low FOV image. Here, either the image of FIG. 34 or the image of FIG. 33 (or both) is scaled so as to equalise the scale of the images of FIG. 33 and FIG. 34. For example, if the low FOV image (FIG. 34) encompasses 50% in each linear direction of the extent of the high FOV image (FIG. 33), then an example scaling operation applies to the image of FIG. 34 is by a factor of 50% in each linear direction. In the particular example shown, the aim is that one or both of the images is scaled so that the helicopter is the same size in the two images. This then allows image content from the low FOV image to be inserted into the wider FOV but lower resolution view of the high FOV image.

This insertion of image content is illustrated schematically in FIG. 35, in which a broken line 1700 indicates the original boundary of the low FOV image of FIG. 34. At a basic level, image content inside the boundary 1700 could be provided from the low FOV image and image content outside the boundary 1700 could be provided from the high FOV image.

But in a more sophisticated arrangement, in order to avoid an abrupt transition in image quality at the boundary 1700, a border region is defined between the boundary 1700 and a border outline 1710 which lies inside the boundary 1700. In the border region the two images are mixed in proportions which vary between the outline 1710 and the boundary 1700 so that at the outline 1710, the composite image of FIG. 35 is derived entirely from the low FOV image of FIG. 34, at the boundary 1700 the composite image is derived entirely from the high FOV image of FIG. 33, and in between the outline 1710 and the boundary 1700, the proportions of the two images vary with distance between the outline 1710 and the boundary 1700, for example as a linear variation. This provides a smoother transition between portions of the composite image 35 derived from the two contributing images.

In a further possible mode of operation, the sharp corners of the boundary 1700 and/or of the outline 1710 could be rounded, perhaps by applying a radiused part-circular outer shape extending over 90° and having a radius of (for example) 5% of the lateral width of the (scaled) image of FIG. 34. An example 1720 of such a radiused profile is illustrated in FIG. 35 in respect of one corner, but it will be appreciated that the same profile could be applied to either or both of (a) all four corners of the boundary 1700, and (b) all four corners of the outline 1710, if used. The use of a radiused or otherwise smoothed outline or boundary can avoid visible artefacts relating to the mixing of the images occurring at the sharp corners.

It will be appreciated that more than two images could be used with different respective FOVs, such that the images are then combined to form a composite image in a similar manner to that described with reference to FIG. 35. If more than two different FOVs are used, the set of images could (for example) comprise:

(a) a succession of different FOV images centred on the same location, that is to say, the same point or region of interest; and/or (b) a high FOV image covering (for example) the whole of the originally rendered image, plus two or more lower FOV images relating to respective different regions of interest.

Techniques will now be described for encoding multiple FOV images in such a way that they can be passed from, for example, a gaming console to an HMD for display, using a conventional format transmission medium such as an HDMI interface and cable.

One example technique involves formatting or disguising the pairs of images (high FOV and low FOV) as "dummy" 3-D high-definition images for example for transmission over a link such as an HDMI 1.4 video link. Another example technique involves encoding the pairs of images at a higher frame rate than the rate at which the images were generated.

Accordingly, the techniques described with reference to FIG. 35 provide examples of one or more of: using primarily image content from the low FOV representation in respect of image regions represented by the low FOV representation, and using image content from the respective high FOV representation for other image regions; for at least a central region of the low FOV representation, replacing image content of the high FOV representation by corresponding image content of the low FOV representation; and for at least a peripheral region of the low FOV representation, mixing image content of the high and low FOV representations. The re-projection techniques discussed above may also be used so that the combining of the images comprises re-projecting to form a respective display image, according to a desired display viewpoint.

FIG. 36 schematically illustrates the encoding of multiple FOV images as successive composite images.

In both FIG. 36 and FIG. 37 to be described below, it is assumed that the display (in this example, an HMD) is a stereoscopic display and so both left and right images are generated. The left and right images generated at a frame rate of (for example) 30 Hz and a resolution of (for example) 1440×1620×2 in the render buffer of, for example, a videogame console, are labelled as images 1800, 1810. From these, an encoder (described below with reference to FIG. 45) generates respective high FOV and low FOV images.

Each of the high and low FOV images for each of the left and right components has the same resolution as each of the others of these four images. They also have the same aspect ratio (in this example) as the original 1440×1620 images. There are combined in pairs by the encoder so that two of the four images generated from the original image pair 1800, 1810 are encoded as a first high-definition 60 Hz frame 1820, and the remaining two are encoded as a next high-definition 60 Hz frame 1830. In this way, all four of the generated images (left, right, high FOV, low FOV) can be transmitted in the original 30 Hz frame period according to which the original images 1800, 1810 were generated. The images can then be processed and displayed at a 30 Hz or other frame rate by the HMD.

FIG. 36 shows one example permutation in which the four images are partitioned into the two high-definition 60 Hz frames 1820, 1830. It will of course be appreciated that the other available permutations may be used instead.

At the HMD, the high FOV and low FOV portions of each of the left and right images are recombined and, in embodiments of the invention, re-projected for display to the user's left and right eyes. In embodiments of the present invention, the re-projection takes place using the techniques discussed with reference to FIGS. 22 and 24 above, which is to say that the latest HMD position is acquired and the image for display to each eye is re-projected based on the latest HMD position and the position applicable at the time that the image was originally generated. Output images for display by the HMD are indicated as 1840, 1850.

FIG. 37 schematically illustrates the encoding of multiple FOV images as dummy 3D images. Here, the term "dummy" implies that the transmission format applicable to 3D images is used, but that the images actually encoded by that transmission format may or may not be viewable (on, for example, a 3D television display) as stereoscopic image pairs. However, note that in some arrangements such as that shown in FIG. 37, the "dummy" images would indeed be viewable stereoscopically on a 3D display, but the image content would perhaps look a little strange to the viewer as the display would show the high FOV image alongside the low FOV image.

Again, the process starts with left and right generated images 1800, 1810, each (in this example) of 1440×1620 pixels in size and being generated at 830 Hz frame rate. Low and high FOV images are formed from each of the left and right images 1800, 1810. In contrast to FIG. 36, however, the pair of left images are formatted into a single frame 1860 and the pair of right images are formatted into a single frame 1870, such that the two frames 1860, 1870 form the left and right images of a 3-D video signal at, for example, a resolution of 720p (720 lines, progressive scan). The frame rate of the 3-D video signal may be, for example, 60 Hz. Again, this allows the low and high FOV portions of each image pair to be transmitted to the HMD using a standard video connection such as an HDMI cable, but this time using a 3-D video transmission standard.

As before, the low and high FOV portions are combined and re-projected at the HMD to form left and right images 1840, 1850 for display by the HMD.

FIG. 38 is a schematic flowchart illustrating operations involved in generating, encoding, decoding and using multiple FOV images steps to the left of a vertical dashed line 1900 are (in this embodiment) carried out by a games console or other data processing system, and steps to the right of the line 1900 carried out by the HMD. Suitable apparatus for performing these steps will be discussed below with reference to FIGS. 45 and 46.

At a step 1910, the games console generates left and right images, for example storing them in a render buffer as discussed above.

At a step 1920, the games console generates a high FOV and a low FOV image in respect of each of the generated left and right images.

At a step 1930, the four resulting images are encoded, for example either as "dummy" 3-D video or as alternate images in a video stream having a higher frame rate than the rate at which the original left and right images were generated at the step 1910. In either case, the encoded images are passed to the HMD, for example using a standard connection such as an HDMI interface and cable.

At a step 1940, the HMD receives and decodes the four images, storing them in a buffer as appropriate.

Finally, at a step 1950, the HMD combines and re-projects the left and right images according to a latest HMD position (using the techniques of FIGS. 22 and 24).

Accordingly, FIGS. 36-38 and their accompanying description provide an example of an image encoding method comprising: for each of a left and a right image of a stereo pair of images, identifying, in an input image, a region of interest; generating at least two generating representations of that input image, such that one of the representations is a high field of view (FOV) representation including substantially all of the input image, and another representation is a low FOV representation having a lower FOV than the high FOV representation, and including at least the region of interest; in which the relationship between pixel resolution and image size for the high FOV representation and the low FOV representation is such that, in relation to the region of interest, the low FOV representation provides a higher amount of image detail than the high FOV representation; generating one or more multiplexed images by juxtaposing at least portions of the left and right, high FOV and low FOV representations, so as to include all of the image content of the left and right, high FOV and low FOV representations in fewer than four multiplexed images; and transmitting and/or storing (or simply "outputting") the multiplexed images.

At the display side, these techniques provide an example of an image display method comprising: receiving multiplexed images transmitted and/or stored by the method defined above; demutiplexing the multiplexed images to generate sets of left and right, high FOV and low FOV representations; and combining the low FOV representation and the high FOV representation of each of the left and right images to provide respective left and right display images.

Suitable apparatus for carrying out these methods (which may or may not operate at least partially under software control) is described below with reference to FIGS. 44-45. The encoding method may be performed by a videogame machine. The display method may be performed by a head mountable display.

Embodiments of the invention also include an image signal comprising successive multiplexed images such that the multiplexed images include juxtaposed portions of left and right, high field of view (FOV) and low FOV representations of an input stereo image pair, so as to include all of the image content of the left and right, high FOV and low FOV representations in fewer than four multiplexed images, in which the relationship between pixel resolution and image size for the high FOV representation and the low FOV representation is such that, in relation to the region of interest, the low FOV representation provides a higher amount of image detail than the high FOV representation, and a storage medium by which such an image signal is stored.

As mentioned above, various permutations of the different images are possible in the multiplexed images, so that embodiments of the invention encompass generating one or more multiplexed images comprises generating a first multiplexed image by juxtaposing the whole of a first one of the left and right, high FOV and low FOV representations next to the whole of a second one of the left and right, high FOV and low FOV representations, and generating a second multiplexed image by juxtaposing the whole of a third one of the left and right, high FOV and low FOV representations next to the whole of a fourth one of the left and right, high FOV and low FOV representations.

In embodiments of the invention the multiplexed images may be output (transmitted, stored etc.) at a higher image repetition rate than the image repetition rate of the input images, or may be output as respective left and right dummy 3D images.

FIG. 39 schematically illustrates a so-called frame tear.

Frame tear is a phenomenon which can occur in videogame systems in which the processes leading to the generation and rendering of an image for display are not time-synchronised with the image display period.

Considering a hypothetical example, if the images are being generated for display at a frame rate of, for example, 30 Hz, then a new image is required every 1/30 second or 33.3 (recurring) milliseconds. If the processes required to generate the image take slightly less than this time, then image generation can be completed just in time before the processing for the next image has to be started. In such a system it could indeed be possible to synchronise image generation and image output.

However, consider the situation if the image generation took (say) 37 ms. If the process was to pause after generating an image and wait for synchronisation at the next image period, they would be a lot of wasted processing time and an image output rate of only 15 Hz would be achieved. In particular, the system would spend almost 30 ms waiting after generation of each image. Indeed, the time taken to generate each image might be variable so that the waiting time would have to be based on the worst case possibility, leading to potentially even more wasted processing time. So, to avoid this waste of processing time, in many systems, as soon as the system has generated one image it is arranged to start the generation of the next image, again taking 37 ms in this example.

This arrangement would avoid a waste of processing capacity but it has to be remembered that the images need to be output at a regular and fixed rate, at each 1/30 second. The result of this lack of synchronisation between image generation and image output is therefore that as each image is output from a render buffer, in many cases it will be formed partly of one image (a partially completed newly generated image) and partly of a preceding image (in respect of those portions which have not yet been overwritten by the newly generated image. This situation is illustrated schematically in FIG. 39, in which, in respect of an arbitrary one of the generated images 1960, a portion 1970 is part of a newly generated image (image n) but another portion 1980 is part of a previously generated image (image n−1).

This type of arrangement is relatively common in videogame systems and in many instances causes no difficulties. However, in a system which uses re-projection, it can cause problems.

This is because each image is originally generated to correspond to a viewpoint of the HMD which is sampled at the time that the generation of that image is initiated. (It will be recalled that re-projection is used to change the viewpoint to the current HMD viewpoint at the time of display of the image). But if an image is formed of different portions as shown in FIG. 39, it may well be that the respective viewpoints applicable to each of the constituent images (image n and image n−1) are different. This can cause a large problem with the re-projection techniques described above.

To address this problem, a particular type of image metadata encoding is used in embodiments of the present invention. This encoding will be described with reference to FIGS. 40 and 41. This is particularly relevant to arrangements in which generating successive output images is performed periodically in synchronisation with a predetermined image output period, but generating image content is performed asynchronously with respect to step of generating successive output images.

FIG. 40 schematically illustrates a metadata encoding technique which is particularly useful in respect of systems which can undergo so-called frame tears. FIG. 41 schematically represents encoded metadata according to this technique.

Referring to FIG. 40, at a step 2000 the view matrix data (metadata defining the view matrix in respect of which an image was generated) corresponding to the view matrix of the upper part of an image to be encoded is encoded at the top of the encoded image. In the example of FIG. 41, the encoding is by means of dummy lines 2010 of pixels in the encoded image, so that instead of these data positions being occupied by pixel data they are instead occupied by encoded view matrix metadata. The lines 2010 will, in the example of FIGS. 39-41, carry the view matrix metadata for image n.

As a step 2020, and image identifier is encoded down the side of the image, for example in a column of dummy pixels 2030. For example, the image identifier may be formed as a rolling seven or eight bit value (so in some encoding techniques this would occupy one column of pixels) which represent successive frames on a rolling basis. The frame identifier value is, in some embodiments at least, present for each line of pixels so that there is a line-by-line definition of which image, in an image tear situation, each line of pixels originated from. In the present example, an upper portion of the column of pixels 2030 encodes the image number n (or at least in these examples a modulo $2^7$ or $2^8$ count of that number) and a lower portion of the column of pixels 2030 encodes the image number n−1.

Of course, not every line has to have a dummy pixel in the column 2030; the encoding could apply to groups of lines (for example, of an eight bit dummy pixel value, each of four two-bit portions of that eight-bit value could indicate the image number (modulo 4) of each of four respective lines. Or indeed the data provided by the column 2030 could be provided once, for example as dummy pixel data in a row at the top or bottom of the image, or elsewhere.

The final stage of the metadata encoding process is at a step 2040 in FIG. 40, in which the view matrix data for the lower portion of the image is encoded at the bottom of the image. In this example, the encoding is by means of one or more dummy rows 2050 of pixels and carries view matrix data for the image n−1.

Accordingly, on the assumption that a frame tear situation will result in no more than two images contributing to a particular output image (in other words, the example of FIG. 39), the present arrangement provides two sets of view matrix data, one at the top of the image which corresponds to the view matrix of the upper portion (or in particular, the view matrix data applicable to the top line of real pixels) and one at the bottom of the image which corresponds to the view matrix of the lower portion (or in particular, the view matrix data applicable to the bottom line of real pixels). The image identifier in the dummy column of pixels 2030 serves to identify which of these sets of view matrix data is applicable to each row of pixels. If three or more images are involved, various positions (such as a further line of pixels at the bottom of the image) can be used for viewpoint data associated with the third or subsequent images.

It will be appreciated that it is not necessary to use dummy pixels to encode these items. Separate associated data could be used instead. However, an advantage of using the dummy pixels as described is that they will always be carried with the image, whereas associated but separate metadata may or may not be stripped or separated from the image by some transmission routes. However, if dummy pixel data is used, it is considered advantageous to position it at extreme edges of the image (top, bottom, left, right) to reduce its impact on the visual part of the image and to allow it to be removed before display.

Embodiments of the invention can provide encoding at least part of the metadata as pixel data within the respective output image. For example, the metadata which indicates which portions of that output image were generated according to each viewpoint may be encoded as pixel data at one edge of each of at least a subset of lines of pixels in that output image. For example, the metadata which indicates which portions of that output image were generated according to each viewpoint may be provided as pixel data at one edge of each line of pixels in that output image, so as to indicate the viewpoint relating to that line of pixels. For example, the metadata indicating each viewpoint relating to image content contained in that output image may be encoded as pixel data within the respective output image. For example, the metadata indicating each viewpoint relating to image content contained in that output image may be encoded as pixel data in one or more rows of pixel data within the respective output image, at the top and/or bottom edges of the output image.

So, in connection with the image transmission techniques discussed earlier, FIGS. 39-41 provide a technique for dealing with frame tears by (a) being able to define using data intrinsic to the image and on a line-by-line basis which original image is represented by each line of pixels; and (b) being able to define multiple sets of view matrix data applicable to different portions of the image. These features then advantageously allow re-projection to be used even though a frame tear has occurred. Techniques for achieving this will be described below.

Accordingly, FIGS. 39-41 (with FIGS. 42-43 discussed below) and their accompanying description provide an example of an image encoding method comprising: generating image content according to a viewpoint defined by image viewpoint data; generating successive output images such that each output image includes image content generated according to one or more viewpoints; and encoding metadata associated with each output image which indicates each viewpoint relating to image content contained in that output image, and which defines which portions of that output image were generated according to each of those viewpoints; and of an image display method for generating successive display images from successive input images each including image content generated according to one or more viewpoints, the input images each having associated metadata which indicates each viewpoint relating to image content contained in that input image, and which defines which portions of that input image were generated according to each of those viewpoints, the method comprising: re-projecting the portions of each input image to form a respective display image, according to any differences between a desired display viewpoint and the viewpoint defined for that portion by the metadata associated with the input image. FIGS. 44-45 provide examples of apparatus to carry out such methods, possibly (though not necessarily) at least partially under the control of suitable computer software. The encoding method may be carried out by a videogame machine. The display method may be carried out by a head-mountable display system.

Embodiments of the invention also include an image signal generated using these techniques, for example an image signal comprising successive output images such that each output image includes image content generated according to one or more viewpoints and metadata associated with each output image which indicates each viewpoint relating to image content contained in that output image, and which defines which portions of that output image were generated according to each of those viewpoints, and a storage medium (such as a disk or memory medium) by which such a signal is stored.

Of course, in the event that a frame tear does not occur in respect of a particular image, the two sets of view matrix data in the rows 2010, 2050 will be identical.

FIGS. 42 and 43 are schematic flow charts illustrating two different ways of combining images around a frame tear. The discussion will mention "first" and "second" portions of the frame tear image. It is an arbitrary choice as to which portion corresponds to the portions shown in FIG. 39. For the sake of discussion, the first portion will be taken to mean the portion 1970 in FIG. 39 and the second portion will be taken to mean the portion 1980 and FIG. 39, but the discussion is equally valid if the portions are the other way round.

Referring to FIG. 42, based on the two sets of view matrix data in the rows 2010 and 2050, at a step 2100 the second portion of the frame tear image is re-projected to the viewpoint of the first portion. At a step 2110 the re-projected second portion is combined with the first portion. Then, at a step 2120 the combined image resulting from the step 2110 is re-projected to the viewpoint of the HMD at the time of display.

A different arrangement is schematically illustrated in FIG. 43, in which at a step 2130 the first portion is re-projected using its respective view matrix data to the current HMD viewpoint. At a step 2140 the second portion is re-projected to the same current HMD viewpoint. At a step 2150 the two re-projected portions are combined for display.

As an example of the steps 2120 110 of FIG. 42, FIG. 44 schematically illustrates a re-projection process at a frame tear. Here, an image 2160 has undergone a frame tear during its generation resulting in portions A and B. While this is an arbitrary choice as to which portion is re-projected to the other one, in this example the older frame portion (B) is re-projected to the viewpoint of the newer frame portion (A), partly because there is more likelihood that the viewpoint of the portion A, being more recently acquired, it is closer to the current viewpoint of the HMD. In connection with this example image, the portions of the image generated according to different respective viewpoints are upper and lower image portions; and metadata indicating the viewpoint applicable to the upper image portion may be encoded as pixel data in one or more top-most rows of pixels of the output image, and metadata indicating the viewpoint applicable to the lower image portion as pixel data may be encoded in one or more bottom-most rows of pixels of the output image.

Note that as part of the re-projection and/or display processes, any dummy pixel metadata is removed or masked (or otherwise omitted at any stage in the processing) so as not to be displayed.

The viewpoint for re-projection may be obtained by detecting a current position and/or orientation of the viewer's head; and deriving the display viewpoint in dependence upon the detected current position and/or orientation of the user's head.

(Similarly, as discussed earlier, the viewpoint for image generation may be derived by detecting an initial position and/or orientation of the viewer's head; and providing the detected initial position and/or orientation to an image generator to generate image content according to that initial position and/or orientation as a viewpoint.)

These techniques of course operate equally with single images or with the low and high FOV images of the type discussed above.

As examples of implementations to carry out the various operations discussed above, FIG. 45 schematically illustrates part of an image generator; and FIG. 46 schematically illustrates part of an HMD.

In FIG. 45, a render engine 2200 is responsive to game parameters 2210 to generate appropriate output images which are stored in a render buffer 2220. An output encoder 2230 generates output images of the types discussed above.

In FIG. 46, a decoder and buffer 2240 receives the encoded images provided by the output encoder 2230, decodes them and buffers them. If appropriate, the decoder and buffer 2240 also combines low and high FOV images as discussed above. A re-projection unit 2250 is responsive to the current HMD viewpoint 2260 to generate output images which are displayed on a display (for example, one display for each eye) 2270.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the invention.

Data Signals

It will be appreciated that data signals generated by the variants of apparatus discussed above, and storage or transmission media carrying such signals, are considered to represent embodiments of the present disclosure.

Where methods of processing, coding or decoding are discussed above, it will be appreciated that apparatus configured to perform such methods are also considered to represent embodiments of the disclosure. It will also be appreciated that video storage, transmission, capture and/or display apparatus incorporating such techniques is considered to represent an embodiment of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

The invention claimed is:

1. An image display method for generating successive display images from successive input images each including image content generated according to one or more viewpoints, the input images each having associated metadata which indicates each viewpoint relating to image content contained in that input image, and which defines which portions of that input image were generated according to each respective viewpoint, the method comprising:
   re-projecting, by one or more processors, the portions of each input image to form a respective display image, by image rotation and scaling to correct for any differences between a desired display viewpoint and a particular viewpoint defined for that portion by the metadata associated with a respective input image,
   in which the input images have associated depth data indicating the image depth of one or more image features, and re-projecting comprises repositioning one or more image features within the re-projected image according to the depth data.

2. A method according to claim 1, further comprising:
   detecting a current position and/or current orientation of a viewer's head; and
   deriving the desired display viewpoint in dependence upon the detected current position and/or current orientation of the user's head.

3. A method according to claim 1, further comprising:
   detecting an initial position and/or orientation of the viewer's head;
   providing the detected initial position and/or initial orientation to an image generator to generate image content according to that initial position and/or initial orientation as a viewpoint.

4. A method according to claim 1, further comprising displaying the re-projected image using a display.

5. A method according to claim 4, in which the display is a head-mountable display and the position and/or orientation of the viewer's head is detected by detecting a position and/or orientation of the head-mountable display.

6. A method according to claim 1, in which the step of re-projecting comprises detecting an overlapping portion between a given generated image and a required re-projected image, and reproducing the overlapping portion as part of the re-projected image.

7. A method according to claim 6, comprising filling portions of the re-projected image other than the overlapping portion with image content from a selected image source.

8. A method according to claim 1, in which the metadata is provided as pixel data within the input images, the method further comprising:
   omitting the pixel data from the display images.

9. An image display system operable to generate successive display images from successive input images that each include image content generated according to one or more viewpoints, the input images each having associated metadata which indicates each viewpoint relating to image content contained in that input image, and which defines which portions of that input image were generated according to each respective viewpoint, the system comprising:
- a display element observable by a viewer; and
- an image re-projector configured to re-project the portions of each input image to form a respective display image, by image rotation and scaling to correct for any differences between a desired display viewpoint and a viewpoint defined for that portion by the metadata associated with a respective input image,
- in which the input images have associated depth data indicating the image depth of one or more image features, and re-projecting comprises repositioning one or more image features within the re-projected image according to the depth data.

10. A system according to claim 9, the system being a head-mountable display system.

* * * * *